(12) United States Patent
Bae

(10) Patent No.: US 8,798,360 B2
(45) Date of Patent: Aug. 5, 2014

(54) METHOD FOR STITCHING IMAGE IN DIGITAL IMAGE PROCESSING APPARATUS

(75) Inventor: Soon-min Bae, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 221 days.

(21) Appl. No.: 13/524,694

(22) Filed: Jun. 15, 2012

(65) Prior Publication Data

US 2012/0321178 A1  Dec. 20, 2012

(30) Foreign Application Priority Data

Jun. 15, 2011  (KR) .......................... 10-2011-0057978

(51) Int. Cl.
*G06K 9/00* (2006.01)

(52) U.S. Cl.
USPC ........... 382/162; 382/209; 382/278; 382/284; 358/540; 358/450

(58) Field of Classification Search
USPC ........... 382/209, 278, 284, 294; 358/540, 450
See application file for complete search history.

(56) References Cited

U.S. PATENT DOCUMENTS

| | | | |
|---|---|---|---|
| 5,087,966 A | 2/1992 | Harradine | |
| 5,189,511 A | 2/1993 | Parulski et al. | |
| 6,277,075 B1 | 8/2001 | Torp et al. | |
| 6,856,987 B2* | 2/2005 | Kobayashi et al. | ................... 1/1 |
| 6,922,209 B1 | 7/2005 | Hwang et al. | |
| 7,099,860 B1* | 8/2006 | Liu et al. | ................ 1/1 |
| 7,259,784 B2 | 8/2007 | Cutler | |
| 7,508,990 B2* | 3/2009 | Pace | ............... 382/236 |
| 7,539,599 B2* | 5/2009 | Hasegawa et al. | ............ 702/185 |
| 8,392,430 B2* | 3/2013 | Hua et al. | ...................... 707/748 |
| 2004/0086271 A1 | 5/2004 | Artonne et al. | |
| 2004/0109078 A1 | 6/2004 | Artonne et al. | |
| 2004/0136595 A1 | 7/2004 | Sakuyama et al. | |

(Continued)

FOREIGN PATENT DOCUMENTS

| | | |
|---|---|---|
| JP | 8223481 A | 8/1996 |
| JP | 2006191535 A | 7/2006 |
| JP | 2008122745 A | 5/2008 |

(Continued)

OTHER PUBLICATIONS

Wong et al., "Simultaneous Gamma Correction and Registration in the Frequency Domain," pp. 1-7.

(Continued)

*Primary Examiner* — Yosef Kassa

(74) *Attorney, Agent, or Firm* — Sughrue Mion, PLLC

(57) ABSTRACT

A method of stitching an image to combine at least a first image and a second image in a digital image processing apparatus includes obtaining matching areas of the first image and the second image where the second image overlaps the first image, and changing gradations of an entire area of the second image to make a representative gradation of the matching area of the first image the same as a representative gradation of the matching area of the second image, wherein a change rate in changing at least one of the gradations of the entire area of the second image is set according to a level of a gradation of the second image before the changing the gradations of the entire area of the second image.

19 Claims, 22 Drawing Sheets

(56) References Cited

U.S. PATENT DOCUMENTS

2006/0221230 A1 10/2006 Dutta et al.
2006/0269125 A1 11/2006 Kalevo et al.
2007/0030396 A1 2/2007 Zhou et al.
2007/0047803 A1 3/2007 Nikkanen
2007/0189729 A1 8/2007 Oyama
2007/0237422 A1 10/2007 Zhou et al.
2008/0123952 A1 5/2008 Parkkinen et al.
2009/0160931 A1 6/2009 Pockett et al.

FOREIGN PATENT DOCUMENTS

| JP | 2010193478 A | 9/2010 |
| KR | 100297714 B1 | 5/2001 |
| KR | 100742466 B1 | 7/2007 |
| KR | 100848589 B1 | 7/2008 |

OTHER PUBLICATIONS

Kimmel et al., "A Variational Framework for Retinex," International Journal of Computer Vision 52(1), pp. 7-23, 2003.

\* cited by examiner

FIG. 2
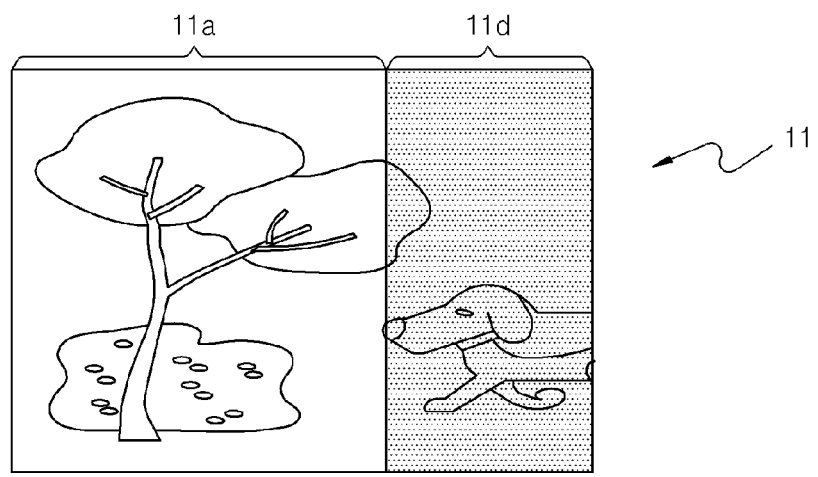
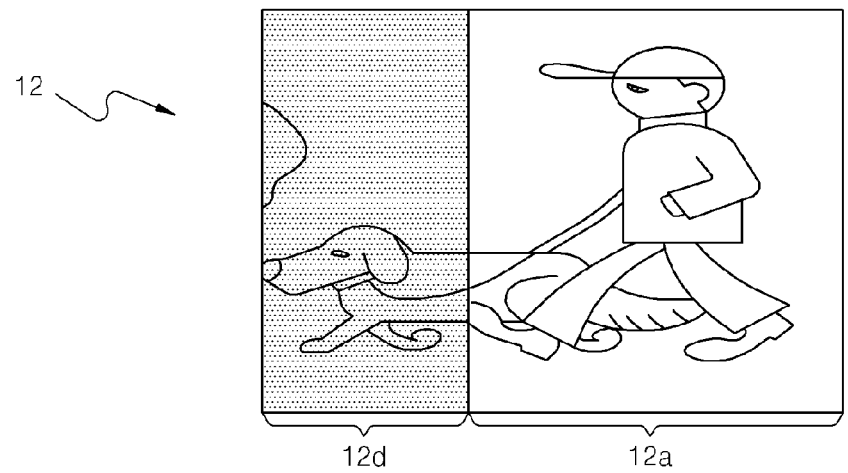

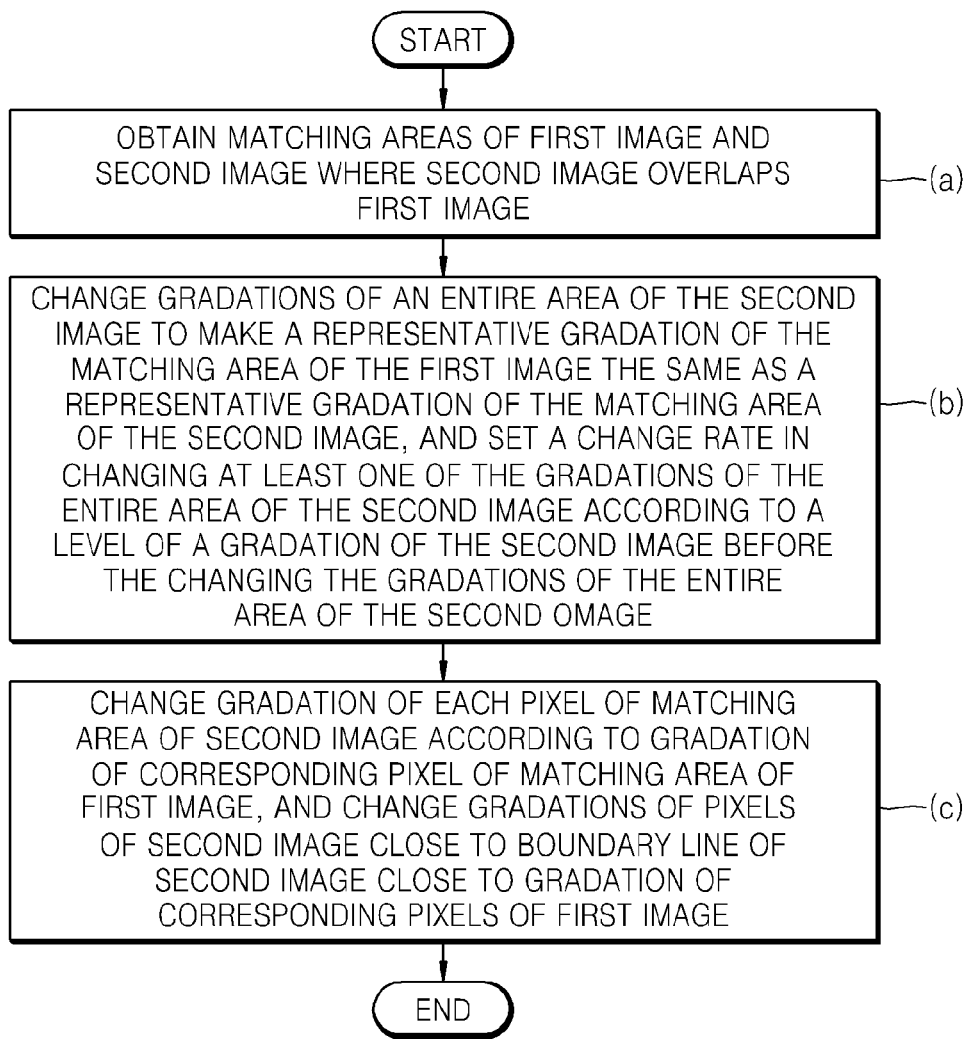
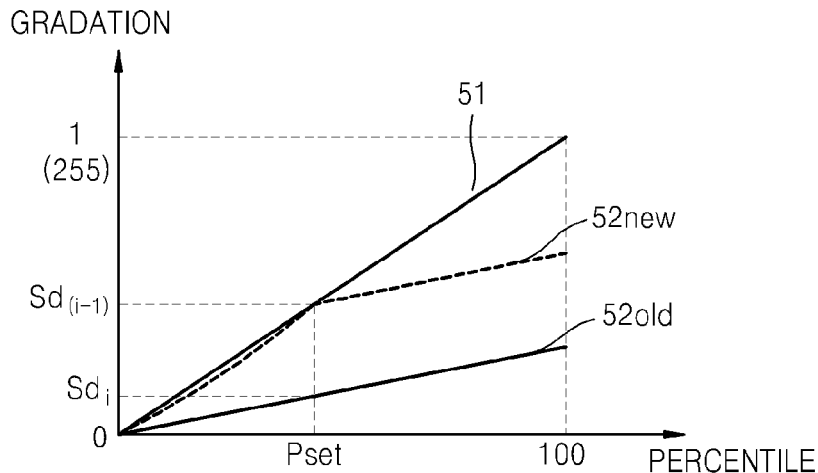

METHOD FOR STITCHING IMAGE IN DIGITAL IMAGE PROCESSING APPARATUS

CROSS-REFERENCE TO RELATED PATENT APPLICATION

This application claims priority from Korean Patent Application No. 10-2011-0057978, filed on Jun. 15, 2011, in the Korean Intellectual Property Office, the disclosure of which is incorporated herein in its entirety by reference.

BACKGROUND

1. Field

Exemplary embodiments relate to a method for generating a panoramic image in a digital image processing apparatus, and more particularly, to a method for stitching an image in a digital image processing apparatus such as a surveillance camera, a digital camera, a phone camera, and a camera-image receiving apparatus.

2. Description of the Related Art

A digital image processing apparatus such as a surveillance camera, a digital camera, a phone camera, and a camera-image receiving apparatus may generate a panoramic image by combining at least a first image and a second image. In a method for stitching an image to combine at least a first image and a second image, processing gradation is important in a matching area between the first and second images where the second image overlaps the first image. Accordingly, if gradations of the second image are used for the matching area without a change, the vicinity of a boundary line of the second image to the first image appears to be remarkable.

Thus, a conventional method for stitching an image in a digital image processing apparatus includes the following two operations.

First, a matching area between a first image and a second image where the second image overlaps the first image is obtained.

Second, a gradation of each pixel of the matching area of the second image is changed according to a gradation of a corresponding pixel of the matching area of the first image. In doing so, gradations of pixels of the second image close to a boundary line of the second image with respect to the first image are changed to be similar to gradations of corresponding pixels of the first image.

Accordingly, the vicinity of a boundary line of the second image to the first image does not appear to be remarkable.

Furthermore, when a difference in gradation between the first and second images is large, a smear-looking phenomenon may be generated around the boundary line of the second image to the first image.

SUMMARY

One or more exemplary embodiments provide a method of stitching an image that may prevent a smear-looking phenomenon from being generated in the vicinity of a boundary line of a second image to a first image when a difference in gradation between the first and second images is large in a digital image processing apparatus.

According to an aspect of an exemplary embodiment, there is provided a method of stitching an image to combine at least a first image and a second image in a digital image processing apparatus, the method including (a) obtaining matching areas of a first image and a second image where the second image overlaps the first image; (b) changing gradations of an entire area of the second image to make a representative gradation of a matching area of the first image the same as a representative gradation of a matching area of the second image, wherein a change rate in changing at least one of the gradations of an entire area of the second image is set according to a level of a gradation of the second image before the changing the gradations of the entire area of the second image; and (c) changing a gradation of each pixel of the matching area of the second image according to a gradation of a corresponding pixel of the matching area of the first image, and changing gradations of pixels of the second image close to a boundary line of the second image with respect to the first image to be similar to gradations of corresponding pixels of the first image.

The operation (b) may include (b1) changing red (R) gradations of the entire area of the second image to make a representative red (R) gradation in the matching area of the first image the same as a representative red (R) gradation of the matching area of the second image, wherein a change rate in changing each of the red (R) gradations of the entire area of the second image is set according to a level of a red (R) gradation of the second image before the changing the gradations of the entire area of the second image; (b2) changing green (G) gradations in the entire area of the second image to make a representative green (G) gradation of the matching area of the first image the same as a representative green (G) gradation of the matching area of the second image, wherein a change rate in changing each of green (G) gradations in the entire area of the second image is set according to a level of a green (G) gradation of the second image before the changing the gradations of the entire area of the second image; and (b3) changing blue (B) gradations in the entire area of the second image to make a representative blue (B) gradation of the matching area of the first image the same as a representative blue (B) gradation of the matching area of the second image, wherein a change rate in changing each of blue (B) gradations in the entire area of the second image is set according to a level of a blue (B) gradation of the second image before the changing the gradations of the entire area of the second image.

In the operation (b1), the setting of the representative red (R) gradation in the matching area of the first image and the representative red (R) gradation of the matching area of the second image may include (b1-1a) obtaining a percentile of each of all red (R) gradations of the matching area of the first image; (b1-1b) obtaining a percentile of each of all red (R) gradations of the matching area of the second image; (b1-1c) setting a red (R) gradation corresponding to a set percentile of all red (R) gradations of the matching area of the first image to be a representative red (R) gradation of the matching area of the first image; and (b1-1d) setting a red (R) gradation corresponding to a set percentile of all red (R) gradations of the matching area of the second image to be a representative red (R) gradation of the matching area of the second image.

The operation (b1) may include (b1-2a) normalizing the red (R) gradations of the entire area of the second image to be within a range of 0 to 1; (b1-2b) assuming that a normalized representative red (R) gradation of the matching area of the first image is $Rd_{(i-1)}$ and a normalized representative red (R) gradation of the matching area of the second image is $Rd_i$, obtaining a red (R) gamma value $\gamma(R)$ according to an equation of $Rd_{(i-1)} = Rd_i^{\gamma(R)}$; (b1-2c) squaring each of normalized red (R) gradations of the entire area of the second image by using the obtained red (R) gamma value $\gamma(R)$ as a multiplier; (b1-2d) extending result values of $\gamma(R)$ squared to belong to an original gradation range; and (b1-2e) setting extended result values to be red (R) gradations of the entire area of the second image.

In the operation (b2), the setting of the representative green (G) gradation in the matching area of the first image and the representative green (G) gradation of the matching area of the second image may include (b2-1a) obtaining a percentile of each of all green (G) gradations of the matching area of the first image; (b2-1b) obtaining a percentile of each of all green (G) gradations of the matching area of the second image; (b2-1c) setting a green (G) gradation corresponding to a set percentile of all green (G) gradations of the matching area of the first image to be a representative green (G) gradation of the matching area of the first image; and (b2-1d) setting a green (G) gradation corresponding to a set percentile of all green (G) gradations of the matching area of the second image to be a representative green (G) gradation of the matching area of the second image.

The operation (b2) may include (b2-2a) normalizing the green (G) gradations of the entire area of the second image to be within a range of 0 to 1; (b2-2b) assuming that a normalized representative green (G) gradation of the matching area of the first image is $Gd_{(i-1)}$ and a normalized representative green (G) gradation of the matching area of the second image is $Gd_i$, obtaining a green (G) gamma value $\gamma(G)$ according to an equation of $Gd_{(i-1)} = Gd_i^{\gamma(G)}$; (b2-2c) squaring each of normalized green (G) gradations of the entire area of the second image by using the obtained green (G) gamma value $\gamma(G)$ as a multiplier; (b2-2d) extending result values of $\gamma(G)$ squared to belong to an original gradation range; and (b2-2e) setting extended result values to be green (G) gradations of the entire area of the second image.

In the operation (b3), the setting of the representative blue (B) gradation in the matching area of the first image and the representative blue (B) gradation of the matching area of the second image may include (b3-1a) obtaining a percentile of each of all blue (B) gradations of the matching area of the first image; (b3-1b) obtaining a percentile of each of all blue (B) gradations of the matching area of the second image; (b3-1c) setting a blue (B) gradation corresponding to a set percentile of all blue (B) gradations of the matching area of the first image to be a representative blue (B) gradation of the matching area of the first image; and (b3-1d) setting a blue (B) gradation corresponding to a set percentile of all blue (B) gradations of the matching area of the second image to be a representative blue (B) gradation of the matching area of the second image.

The operation (b3) may include (b3-2a) normalizing the blue (B) gradations of the entire area of the second image to be within a range of 0 to 1; (b3-2b) assuming that a normalized representative blue (B) gradation of the matching area of the first image is $Bd_{(i-1)}$ and a normalized representative blue (B) gradation of the matching area of the second image is $Bd_i$, obtaining a blue (B) gamma value $\gamma(B)$ according to an equation of $Bd_{(i-1)} = Bd_i^{\gamma(B)}$; (b3-2c) squaring each of normalized blue (B) gradations of the entire area of the second image by using the obtained blue (B) gamma value $\gamma(B)$ as a multiplier; (b3-2d) extending result values of $\gamma(B)$ squared to belong to an original gradation range; and (b3-2e) setting extended result values to be blue (B) gradations of the entire area of the second image.

According to another aspect of an exemplary embodiment, there is provided a method of stitching an image to combine a plurality of images in a digital image processing apparatus, the method including (a) obtaining an average gradation of each of a plurality of images; (b) setting one of the plurality of images having a greatest difference in the average gradation from the other images as a reference image, and setting each of the other images of the plurality of images including the reference image as an object image; and (c) the following operations (c1) to (c3) are performed for each of the set object image.

In the operation (c1), a matching image of the reference image with respect to an adjacent image may be obtained and a matching area of the object image with respect to the adjacent image may be obtained.

In the operation (c2), gradations of an entire area of the object image may be changed to make a representative gradation of the matching area of the reference image the same as a representative gradation of the matching area of the object image, wherein a change rate in changing at least one of the gradations of the entire area of the object image is set to a level of a gradation of the object image before the gradations of the object image are changed.

In the operation (c3), a gradation of each pixel of the matching area of the object image may be changed according to a gradation of a corresponding pixel of the matching area of the adjacent image, and gradations of pixels of the object image close to a boundary line of the object image with respect to the adjacent image may be changed similar to gradations of corresponding pixels of the adjacent image;

According to another aspect of an exemplary embodiment, there is provided a method of stitching an image to combine a plurality of images in a digital image processing apparatus, the method including (a) setting one of the plurality of images selected by a user as a reference image; (b) setting each of the other images of the plurality of images including the reference image as an object image; and (c) performing the above operations (c1) to (c3) with respect to each of the set object images.

BRIEF DESCRIPTION OF THE DRAWINGS

The above and/or other aspects will become more apparent by describing in detail exemplary embodiments thereof with reference to the attached drawings, in which:

FIG. 2 illustrates a matching area of each of the first and second images of FIG. 1;

FIG. 4 is a flowchart for explaining a method for stitching an image according to an exemplary embodiment;

FIG. 5 is a graph for explaining the operation (b) of FIG. 4;

DETAILED DESCRIPTION OF THE EXEMPLARY EMBODIMENTS

Figure 1:
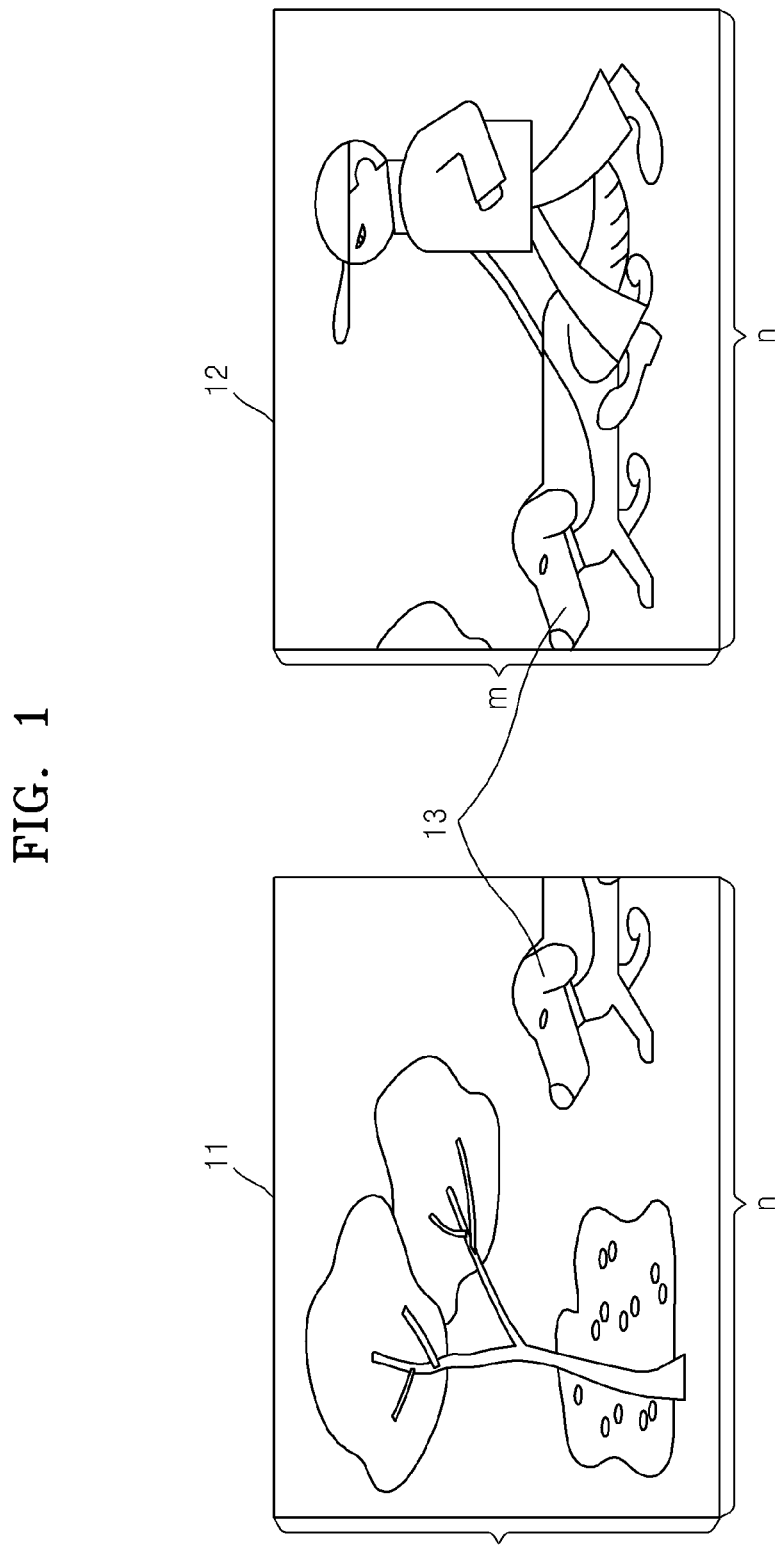
FIG. 1 illustrates a first image and a second image to be combined according to an exemplary embodiment.

The attached drawings for illustrating exemplary embodiments are referred to in order to gain a sufficient understanding of the inventive concept, the merits thereof, and the objectives accomplished by the implementation of the inventive concept. Hereinafter, the exemplary embodiments will be described in detail with reference to the attached drawings. Like reference numerals in the drawings denote like elements.

As used herein, the term "and/or" includes any and all combinations of one or more of the associated listed items. Expressions such as "at least one of," when preceding a list of elements, modify the entire list of elements and do not modify the individual elements of the list.

FIG. 1 illustrates a first image 11 and a second image 12 to be combined according to an exemplary embodiment. Referring to FIG. 1, the first image 11 and the second image 12 are combined according to an image stitching method according to an exemplary embodiment in a digital image processing apparatus such as a surveillance camera, a digital camera, a phone camera, and a camera-image receiving apparatus. Each of the first and second images 11 and 12 includes m-number of pixels in a vertical direction and n-number of pixels in a horizontal direction.

FIG. 2 illustrates matching areas 11d and 12d of the first and second images 11 and 12 of FIG. 1. Referring to FIG. 2, the first image 11 is divided into a main area 11a and the matching area 11d. Likewise, the second image 12 is divided into a main area 12a and the matching area 12d. Each of the matching areas 11d and 12d signifies an area where the second image 12 overlaps the first image 11.

Figure 3:
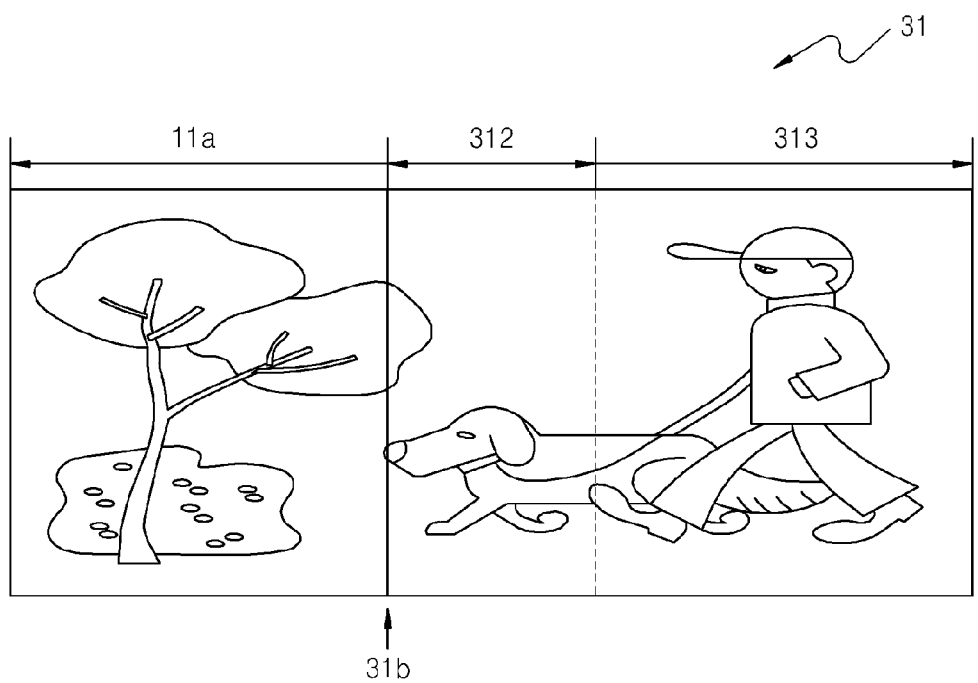
FIG. 3 illustrates a panoramic image obtained by combining the second image of FIG. 2 to the first image of FIG. 2.

FIG. 3 illustrates a panoramic image obtained by combining the second image 12 of FIG. 2 to the first image 11 of FIG. 2. Referring to FIGS. 2 and 3, when the matching area 12d of the second image 12 overlaps the matching area 11d of the first image 11, gradations of the second image 12 are changed according to an exemplary embodiment. Thus, a panoramic image 31 generated according to an exemplary embodiment is divided into the main area 11a of the first image 11, a gradation-changed matching area 312 corresponding to the overlapping area of the first image 11 and the second image 12, and a gradation-changed main area 313 of the second image 12.

FIG. 4 is a flowchart for explaining a method for stitching an image according to an exemplary embodiment. FIG. 5 is a graph for explaining the operation (b) of FIG. 4. In other words, FIG. 5 is a graph showing a percentile of each gradation of the matching area 11d of the first image 11 and the matching area 12d of the second image 12. In the present embodiment, although a gradation ranges from 0 to 255, the gradations are normalized to 0 or 1 and then restored in order to prevent a result of calculation from escaping from the range. In FIG. 5, "51" denotes a gradation percentile of the matching area 11d of the first image 11 of FIG. 2, "52old" denotes the original gradation percentile of the matching area 12d of the second image 12 of FIG. 2, "52new" denotes a changed gradation percentile of the matching area 12d of the second image 12, "Pset" denotes a set percentile, "$Sd_{(i-1)}$" denotes a representative gradation of the matching area 11d of the first image 11, and "$Sd_i$" denotes a representative gradation of the matching area 12d of the second image 12. In an image processing method like the present embodiment, an appropriate representative value may be more quickly obtained by using a percentile rather than using a percentage.

Figure 6:
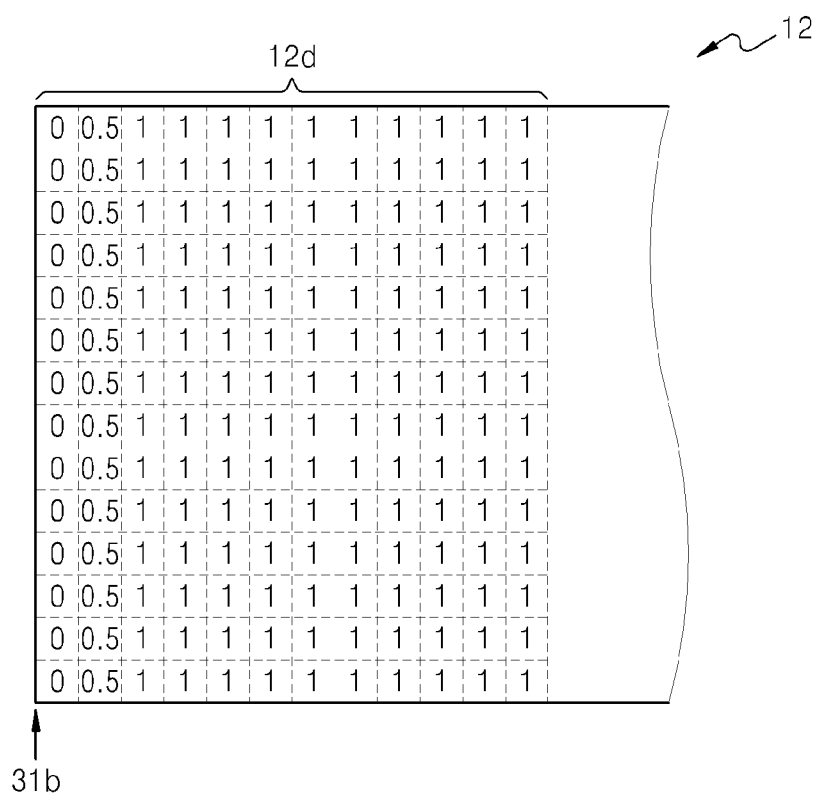
FIG. 6 is an alpha ($\alpha$) value allocation table showing rates to change gradations of pixels of the matching area of the second image in operation (c) of FIG. 4.

FIG. 6 is an alpha (α) value allocation table showing rates to change gradations of pixels of the matching area 12d of the second image 12 in the operation (c) of FIG. 4. In FIGS. 1 to 3, 5, and 6, like reference numerals denote like elements having the same functions. The image stitching method of FIG. 4 will now be described with reference to FIGS. 2 to 6.

The image stitching method according to the present embodiment includes operations (a) to (c). In operation (a), the matching areas 11d and 12d of the first and second images 11 and 12 where the second image 12 overlaps the first image 11 are obtained. A method of obtaining the matching areas 11d and 12d for image stitching is already well known. For example, the matching areas 11d and 12d may be obtained by using common characteristics or areas that are precisely set in advance may be obtained as the matching areas 11d and 12d. Accordingly, a detailed description thereof will be omitted herein.

In operation (b), gradations of the matching area 12d and the main area 12a of the second image 12 are changed to make the representative gradation $Sd_{(i-1)}$ of the matching area 11d of the first image 11 the same as the representative gradation $Sd_1$ of the matching area 12d of the second image 12 in FIG. 5. In doing so, a change rate of change of at least one or each of the gradations of the matching area 12d and the main area 12a of the second image 12 is set according to a level of a gradation of the second image 12 before the gradations of the second image 12 are changed.

In the operation (b), while only the graph 52new of a changed gradation percentile of the matching area 12d of the second image 12 is illustrated in FIG. 5, a graph of a changed gradation percentile of the main area 12a of the second image 12 is omitted in FIG. 5. In other words, gradations of the entire matching areas 12d and main area 12a of the second image 12 are changed to make the representative gradation $Sd_{(i-1)}$ of the matching area 11d of the first image 11 the same as the representative gradation Sd₁ of the matching area 12d of the second image 12. Of course, when only the gradation of the matching area 12d of the second image 12 is changed, the matching area 12d of the second image 12 and the main area 12a of the second image 12 may be seen at different brightness.

Thus, since the gradations of the matching area 12d and main area 12a of the second image 12 are changed, the generation of a smear-looking phenomenon in the vicinity of a boundary line 31b of FIG. 3 of the second image 12 to the first image 11 when a difference in gradation between the first and second images 11 and 12 is large may be prevented.

The change rate in changing each of the gradations of the matching area 12d and the main area 12a of the second image 12 is set according to a level of the gradation of the second image before the gradations of the second image 12 are changed. In other words, while low gradations of the second image 12 are changed to be similar to low gradations of the first image 11, high gradations of the second image 12 are changed to be slightly close or less similar to high gradations of the first image 11.

Thus, since only the low gradations of the second image 12 are changed to be similar to the low gradations of the first image 11 by using a visual characteristic that is sensitive to a difference in the low gradation, the generation of a smear-looking phenomenon may be prevented and the change in gradation of the second image 12 may be reduced.

In the operation (c), the gradation of each pixel of the matching area 12d of the second image 12 is changed according to the gradation of a corresponding pixel of the matching area 11d of the first image 11. In doing so, the gradations of the pixels of the second image 12 close to the boundary line 31b of FIG. 3 of the second image 12 with respect to the first image are changed to be similar to the gradations of corresponding pixels of the first image 11.

An alpha (α) value of FIG. 6 applied to the operation (c) of the present embodiment is substituted in the following Equation 1.

$$R_i3(x,y)=\alpha R_i2(x,y)+(1-\alpha)\cdot R_{(i-1)}(f(x,y))$$ [Equation 1]

In Equation 1, "$R_i3(x,y)$" denotes a gradation of the $(x,y)^{th}$ pixel of the matching area 12d of the second image 12 after the change. "$R_i2(x,y)$" denotes a gradation of the $(x,y)^{th}$ pixel of the matching area 12d of the second image 12 before the change, that is, a gradation according to a result of the operation (b). "$R_{(i-1)}(f(x,y))$" denotes a gradation of a corresponding pixel of the matching area 11d of the first image 11. "f(x,y)" signifies that a coordinate of a pixel of the matching area 11d of the first image 11 is converted to correspond to the coordinate of a pixel of the matching area 12d of the second image 12.

Thus, when the alpha (α) value of FIG. 6 is substituted in Equation 1, the gradations of the pixels of the second image 12 in a row that is the closest to the boundary line 31b of FIG. 6 are changed to be the same as the gradations of the corresponding pixels of the first image 11. Each of the gradations of the pixels of the second image 12 in a row that is the next closest to the boundary line 31b in FIG. 6 is changed to a value obtained by summing the half of each of the gradations before the change and the half of the gradation of a corresponding pixel of the matching area 11d of the first image 11. The gradations of the other pixels of the matching area 12d of the second image 12 are the same as the gradations before the change.

As a result, according to a result of the operation (c), the vicinity of the boundary line 31b of the second image 12 to the first image 11 does not appear to be remarkable. The alpha (α) values of FIG. 6 are mere examples. For example, the alpha (α) values of "0", "0.25", "0.75", and "1" may be applied as in FIG. 6.

Since the method of the operation (c) is already known, a further description thereof will be omitted herein. In the present embodiment, the above additional effects may be obtained as the operation (b) is inserted in the method. Thus, the operation (b) will now be described in detail.

Figure 7:
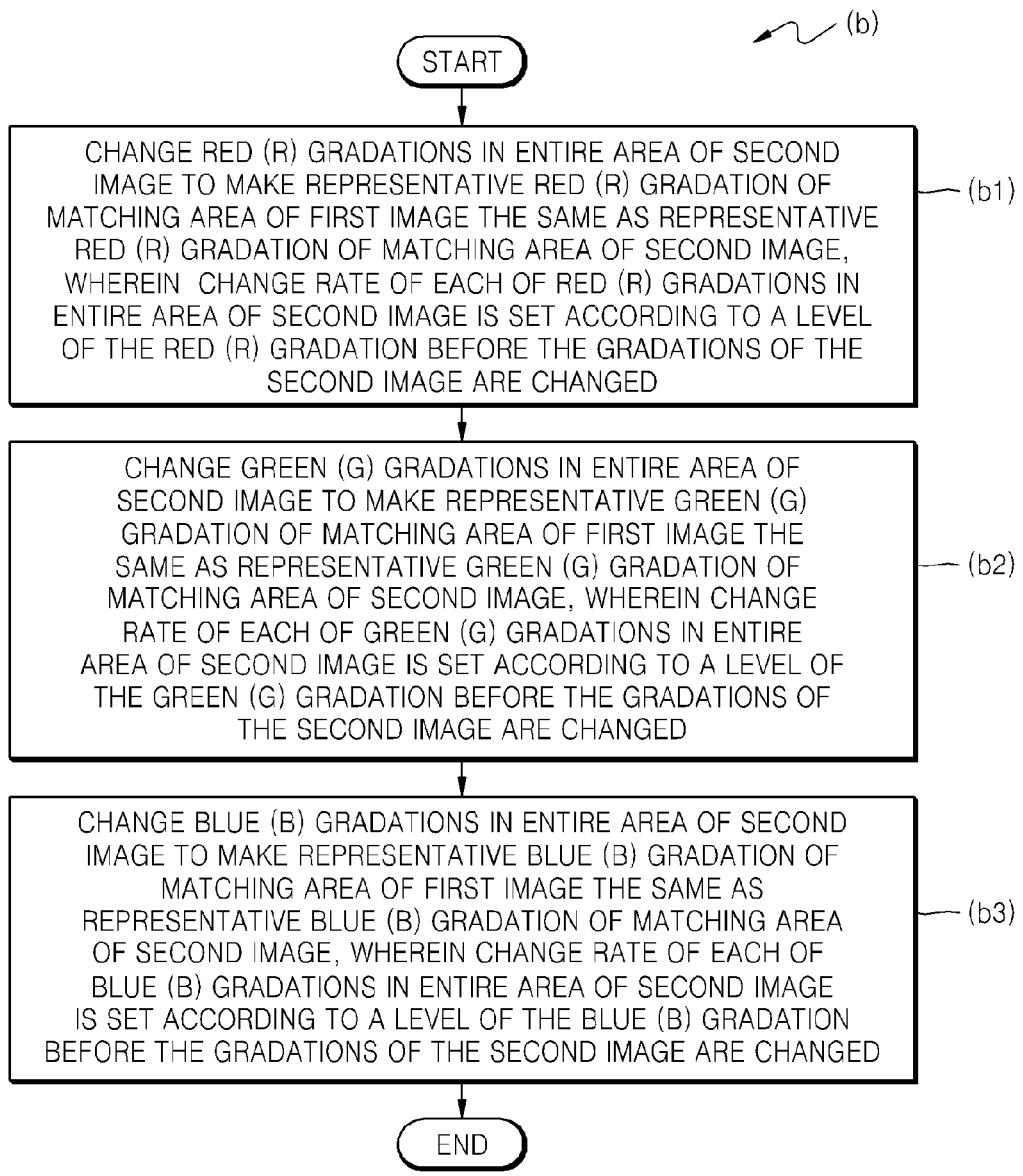
FIG. 7 is a flowchart for explaining operation (b) of FIG. 4.
Figure 8:
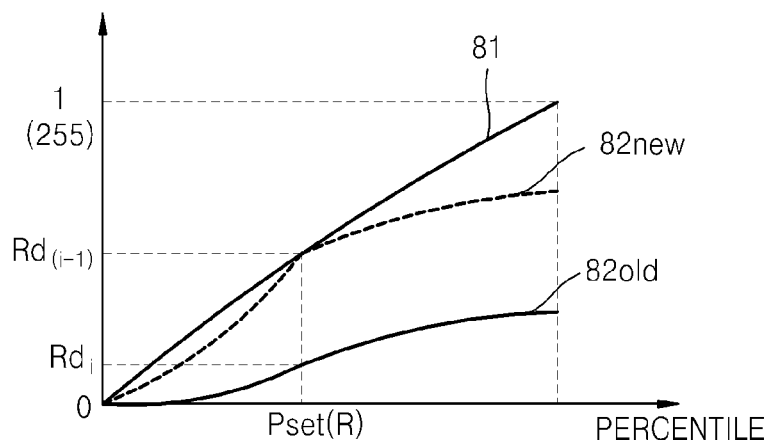
FIG. 8 is a graph for explaining operation (b1) of FIG. 7.

FIG. 7 is a flowchart for explaining in detail operation (b) of FIG. 4. FIG. 8 is a graph for explaining the operation (b1) of FIG. 7. In other words, FIG. 8 is a graph showing a percentile of a red (R) gradation of each of the matching area 11d of the first image 11 and the matching area 12d of the second image 12. In the present embodiment, although a gradation ranged from 0 to 255, the gradations are normalized to 0 or 1 and then restored in order to prevent a result of calculation from escaping from the range.

In FIG. 8, "81" denotes a red (R) gradation percentile of the matching area 11d of the first image 11 of FIG. 2, "82old" denotes the original red (R) gradation percentile of the matching area 12d of the second image 12 of FIG. 2, "82new" denotes a changed red (R) gradation percentile of the matching area 12d of the second image 12, "Pset(R)" denotes a set percentile, "Rd(i-1)" denotes a representative red (R) gradation of the matching area 11d of the first image 11, and "Rdi" denotes a representative red (R) gradation of the matching area 12d of the second image 12.

Figure 9:
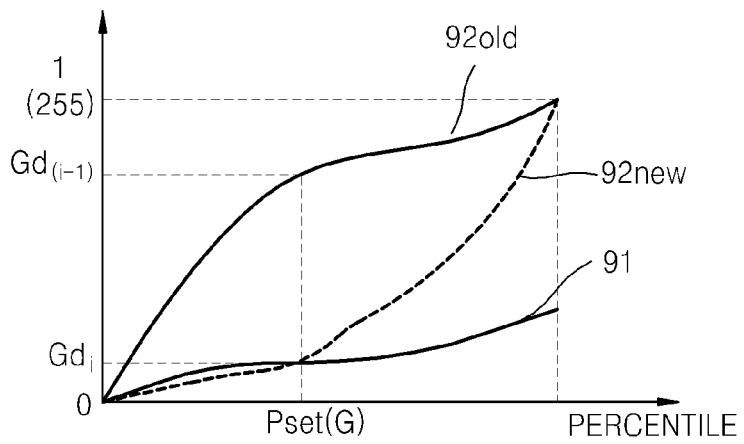
FIG. 9 is a graph for explaining operation (b2) of FIG. 7.

FIG. 9 is a graph for explaining the operation (b2) of FIG. 7. In other words, FIG. 9 is a graph showing a percentile of a green (G) gradation of each of the matching area 11d of the first image 11 and the matching area 12d of the second image 12. In FIG. 9, "91" denotes a green (G) gradation percentile of the matching area 11d of the first image 11 of FIG. 2, "92old" denotes the original green (G) gradation percentile of the matching area 12d of the second image 12 of FIG. 2, "92new" denotes a changed green (G) gradation percentile of the matching area 12d of the second image 12, "Pset(G)" denotes a set percentile, "$Gd_{(i-1)}$" denotes a representative green (G) gradation of the matching area 11d of the first image 11, and "$Gd_i$" denotes a representative green (G) gradation of the matching area 12d of the second image 12.

Figure 10:
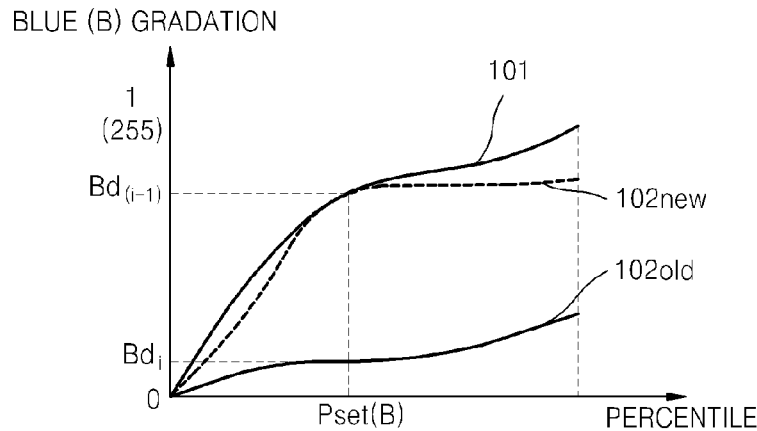
FIG. 10 is a graph for explaining operation (b3) of FIG. 7.

FIG. 10 is a graph for explaining the operation (b3) of FIG. 7. In other words, FIG. 10 is a graph showing a percentile of a blue (B) gradation of each of the matching area 11d of the first image 11 and the matching area 12d of the second image 12. In FIG. 10, "101" denotes a blue (B) gradation percentile of the matching area 11d of the first image 11 of FIG. 2, "102old" denotes the original blue (B) gradation percentile of the matching area 12d of the second image 12 of FIG. 2, "102new" denotes a changed blue (B) gradation percentile of the matching area 12d of the second image 12, "Pset(B)" denotes a set percentile, "$Bd_{(i-1)}$" denotes a representative blue (B) gradation of the matching area 11d of the first image 11, and "$Bd_i$" denotes a representative blue (B) gradation of the matching area 12d of the second image 12.

Referring to FIGS. 7 to 10, operation (b) of FIG. 4 includes operations (b1), (b2), and (b3). In the operation (b1), the red (R) gradations of the entire matching areas 12d and 12a of the second image 12 to make the representative red (R) gradation $Rd_{(1-i)}$ of the matching area 11d of the first image 11 of FIG. 8 the same as the representative red (R) gradation Rd, of the matching area 12d of the second image 12. In doing so, the change rate in changing each of the red (R) gradations of the entire matching areas 12d and 12a of the second image 12 is set according to a level of the red (R) gradation before the gradations of the second image 12 are changed.

In operation (b1), while only the graph 82new of a changed red (R) gradation percentile of the matching area 12d of the second image 12 is illustrated in FIG. 8, a graph of a changed red (R) gradation percentile of the main area 12a of the second image 12 is omitted in FIG. 8. In other words, gradations of the entire matching areas 12d and 12a of the second image 12 are changed to make the representative gradation $Rd_{(i-1)}$ of the matching area 11d of the first image 11 the same as the representative gradation $Rd_i$ of the matching area 12d of the second image 12.

In operation (b2), the green (G) gradations of the entire matching areas 12d and 12a of the second image 12 are changed to make the representative green (G) gradation $Gd_{(i-1)}$ of the matching area 11d of the first image 11 of FIG. 9 the same as the representative green (G) gradation $Gd_i$ of the matching area 12d of the second image 12 of FIG. 9. In doing so, the change rate in changing each of the green (G) gradations of the entire matching areas 12d and 12a of the second image 12 is changed set according to a level of the green (G) gradation before the gradations of the second image 12 are changed.

In the operation (b2), while only the graph 92new of a changed green (G) gradation percentile of the matching area 12d of the second image 12 is illustrated in FIG. 9, a graph of a changed green (G) gradation percentile of the main area 12a of the second image 12 is omitted in FIG. 9. In other words, gradations of the entire matching areas 12d and 12a of the second image 12 are changed to make the representative gradation $Gd_{(i-1)}$ of the matching area 11d of the first image 11 the same as the representative gradation $Gd_i$ of the matching area 12d of the second image 12.

In operation (b3) described in FIG. 7, the blue (B) gradations of the entire matching areas 12d and 12a of the second image 12 are changed to make the representative blue (B) gradation $Bd_{(i-1)}$ of the matching area 11d of the first image 11 of FIG. 10 the same as the representative blue (B) gradation $Bd_i$ of the matching area 12d of the second image 12 of FIG. 10. In doing so, the change rate in changing each of the blue (B) gradations of the entire matching areas 12d and 12a of the second image 12 is set according to a level of the blue (B) gradation before the gradations of the second image 12 are changed.

In operation (b3), while only the graph 102new of a changed blue (B) gradation percentile of the matching area 12d of the second image 12 is illustrated in FIG. 10, a graph of a changed blue (B) gradation percentile of the main area 12a of the second image 12 is omitted in FIG. 10. In other words, gradations of the entire matching areas 12d and 12a of the second image 12 are changed to make the representative gradation $Bd_{(i-1)}$ of the matching area 11d of the first image 11 the same as the representative gradation $Bd_1$ of the matching area 12d of the second image 12.

Thus, since the red (R), green (G), and blue (B) gradations of the entire matching areas 12d and 12a of the second image 12 are changed as described above with reference to FIGS. 7 to 10, the generation of a smear-looking phenomenon in the vicinity of the boundary line 31b of FIG. 3 of the second image 12 to the first image 11 when a difference in gradation between the first and second images 11 and 12 is large may be prevented.

Thus, since only the low gradations of the second image 12 are changed to be similar to the low gradations of the first image 11 by using a visual characteristic that is sensitive to a difference in the low gradation, the generation of a smear-looking phenomenon may be prevented and the change in gradation of the second image 12 may be reduced.

Figure 11:
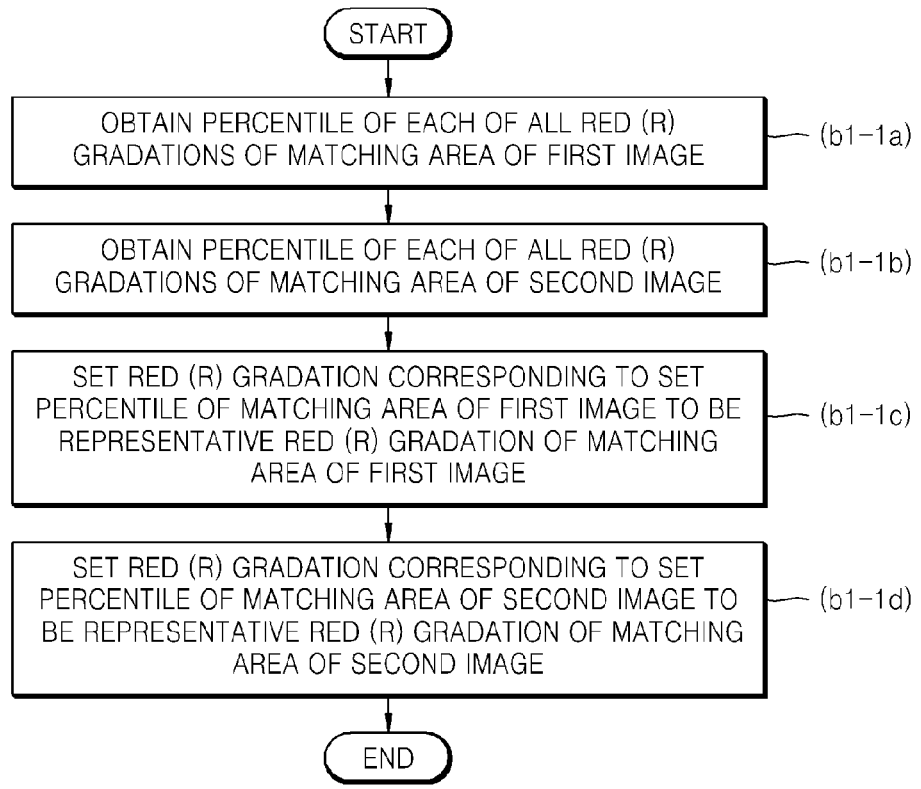
FIG. 11 is a flowchart for explaining setting a representative red (R) gradation of the matching area of the first image and a representative red (R) gradation of the matching area of the second image in operation (b1) of FIG. 7.

FIG. 11 is a flowchart for explaining in detail how to set the representative red (R) gradation $Rd_{(i-1)}$ of the matching area 11d of the first image 11 and the representative red (R) gradation $Rd_i$ of the matching area 12d of the second image 12 of FIG. 8, in the operation (b1) of FIG. 7.

Figure 12:
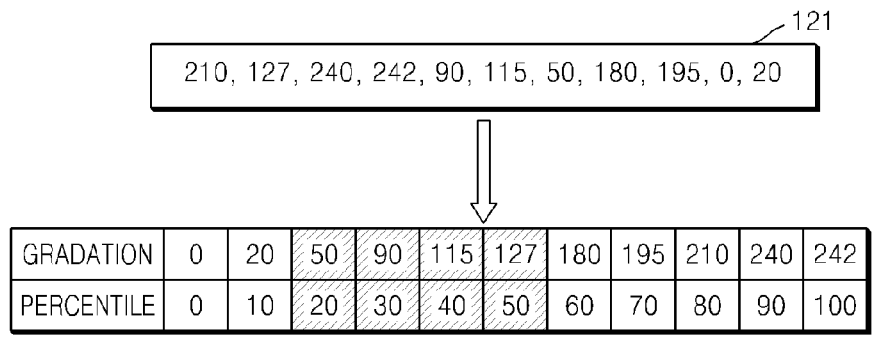
FIG. 12 illustrates a relationship between gradation and percentile described in FIG. 11.

FIG. 12 illustrates the relationship between the gradation and the percentiles of the images as described in FIG. 11. In FIG. 12, a reference numeral 121 denotes, for example, gradations of the matching areas 11d or 12d of the first image 11 or the second image 12. Referring to FIGS. 2, 8, 11, and 12, an explanation of how to set the representative red (R) gradation $Rd_{(i-1)}$ of the matching area 11d of the first image 11 and the representative red (R) gradation $Rd_i$ of the matching area 12d of the second image 12, in operation (b1) of FIG. 7 will now be described.

In operation (b1-1a), a percentile of each of all red (R) gradations, for example, 121, of the matching area 11d of the first image 11 is obtained.

In operation (b1-1b), a percentile of each of all red (R) gradations, for example, 121, of the matching area 12d of the second image 12 is obtained.

In operation (b1-1c), among all red (R) gradations, for example, 121, of the matching area 11d of the first image 11, a red (R) gradation corresponding to the set percentile is set to be the representative red (R) gradation $Rd_{(i-1)}$ of the matching area 11d of the first image 11.

In operation (b1-1d), among all red (R) gradations, for example, 121, of the matching area 12d of the second image 12, a red (R) gradation corresponding to a set percentile is set to be the representative red (R) gradation $Rd_i$ of the matching area 12d of the second image 12.

As described above, in the image processing method according to an exemplary embodiment, an appropriate representative value may be more quickly obtained by using a percentile rather than using a percentage.

Generally, "50" may be regarded as an appropriate set percentile. However, a percentile lower than "50" may be appropriate. This is because a gradation of a percentile lower than "50" may be a representative gradation in consideration of the visual characteristic that is sensitive to a difference in the low gradation. For example, the set percentile may be "20". Of course, the set percentile may be finally determined through experiments. For reference, in FIG. 12, when the set percentile is "20", "30", "40", and "50", the representative gradation is "50", "90","115", and "127", respectively.

Figure 13:
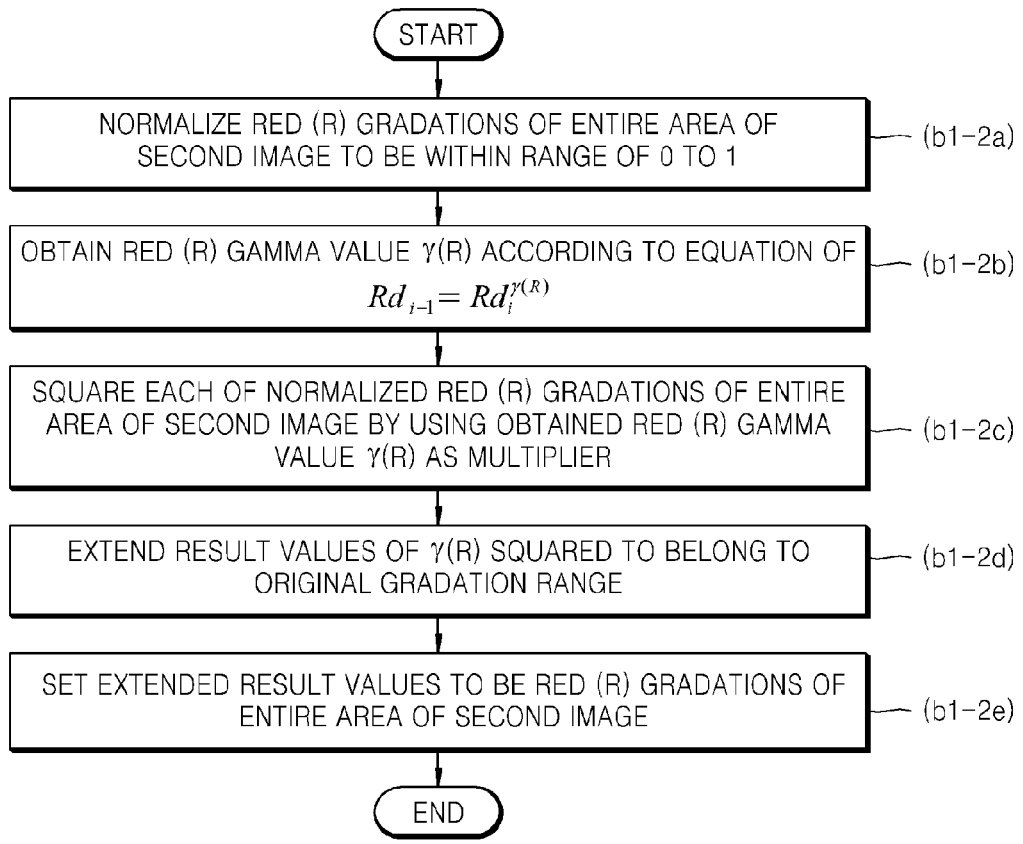
FIG. 13 is a flowchart for explaining in detail operation (b1) of FIG. 7 after the setting of FIG. 11 is completed.

FIG. 13 is a flowchart for explaining in detail operation (b1) of FIG. 7 after the setting of FIG. 11 is completed. The rest of the operations performed in operation (b1) of FIG. 7 after the setting of FIG. 11 is completed will now be described with reference to FIGS. 2, 8, and 13.

In operation (b1-2a), the red (R) gradations of the entire matching areas 12d and 12a of the second image 12 are normalized to be within a range of "0" to "1". As described above, in the present embodiment, although a gradation ranges from 0 to 255, the gradations are normalized to 0 or 1 and then restored in order to prevent a result of calculation from falling beyond the range.

The representative red (R) gradation of the matching area 11d of the first image 11 and the representative red (R) gradation of the matching area 12d of the second image 12 are, of course, normalized. Also, after the red (R) gradations of the matching area 11d of the first image 11 and the red (R) gradations of the entire matching areas 12d and 12a of the second image 12 are first normalized, the representative red (R) gradation of the matching area 11d of the first image 11 and the representative red (R) gradation of the matching area 12d of the second image 12 may be obtained.

In operation (b1-2b), assuming that a normalized representative red (R) gradation of the matching area 11d of the first image 11 is $Rd_{(i-1)}$ and a normalized representative red (R) gradation of the matching area 12d of the second image 12 is $Rd_i$, a red (R) gamma value "γ(R)" is obtained according to an equation that $Rd_{(i-1)}=Rd_i^{\gamma(R)}$.

In detail, when a common logarithm is applied to both sides of the above equation, Equation 2 is established.

$$\log(Rd_{(i-1)})=\gamma(R)\cdot\log(Rd_i) \qquad \text{[Equation 2]}$$

Accordingly, the red (R) gamma value "γ(R)" may be obtained by Equation 3.

$$\gamma(R) = \frac{\log(Rd_{(i-1)})}{\log(Rd_i)} \qquad \text{[Equation 3]}$$

Next, in operation (b1-2c), each of the normalized red (R) gradations of the entire matching areas 12d and 12a of the second image 12 is squared by using the obtained red (R) gamma value "γ(R)" as a multiplier.

Accordingly, as described above with reference to FIG. 8, the red (R) gradations of the entire matching areas 12d and 12a of the second image 12 are changed to make the representative red (R) gradation $Rd_{(i-1)}$ of the matching area 11d of the first image 11 the same as the representative red (R) gradation Rd, of the matching area 12d of the second image 12.

Since the set percentile for the representative red (R) gradation $Rd_{(i-1)}$ of the matching area 11d of the first image 11 and the representative red (R) gradation Rd, of the matching area 12d of the second image 12 each are less than "50", a change rate in changing each of the red (R) gradations of the entire matching areas 12d and 12a of the second image 12 may be set according to a level of the red (R) gradation before the gradations of the second image 12 are changed.

According to experiments, it is found that brightness saturation occurs when the red (R) gamma value "γ(R)" is less than "0.4". Thus, the red (R) gamma value "γ(R)" should be greater than or equal to "0.4".

Next, in an operation (b1-2d), the result values of the "γ(R)" squared are extended to belong to the original gradation range. In the operation (b1-2e), the extended result values are set to be the red (R) gradations of the entire matching areas 12d and 12a of the second image 12.

Figure 14:
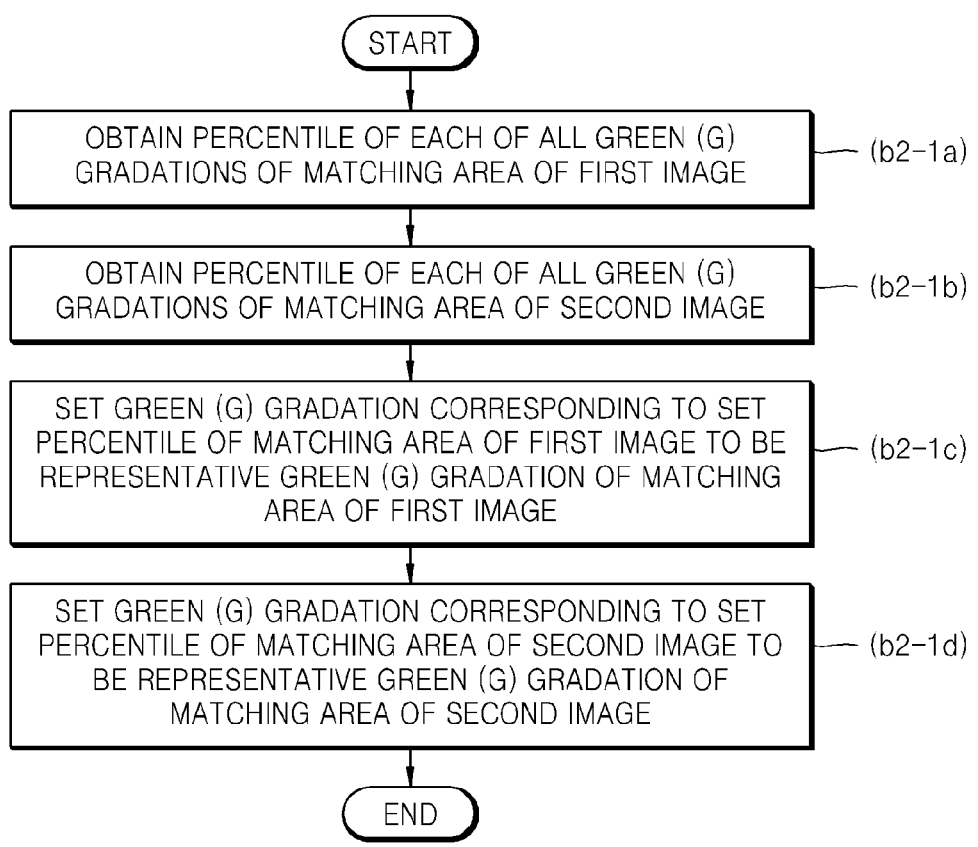
FIG. 14 is a flowchart for explaining setting a representative green (G) gradation of the matching area of the first image and a representative green (G) gradation of the matching area of the second image in the operation (b2) of FIG. 7.

FIG. 14 is a flowchart for explaining in detail how to set a representative green (G) gradation of the matching area 11d of the first image 11 and a representative green (G) gradation of the matching area 12d of the second image 12 of FIG. 2, in operation (b2) of FIG. 7. The flowchart of FIG. 14 is substantially the same as that of FIG. 11. However, for a better understanding of the differences between these two figures, the flowchart of FIG. 14 will now be described with reference to FIGS. 2, 9, 12, and 14.

In operation (b2-1a), a percentile of each of all green (G) gradations, for example, 121, of the matching area 11d of the first image 11 is obtained.

In operation (b2-1b), a percentile of each of all green (G) gradations, for example, 121, of the matching area 12d of the second image 12 is obtained.

In operation (b2-1c), among all green (G) gradations, for example, 121, of the matching area 11d of the first image 11, a green (G) gradation corresponding to a set percentile is set to be the representative green (G) gradation $Gd_{(i-1)}$ of the matching area 11d of the first image 11.

In an operation (b2-1d), among all green (G) gradations, for example, 121, of the matching area 12d of the second image 12, a green (G) gradation corresponding to a set percentile is set to be the representative green (G) gradation $Gd_i$ of the matching area 12d of the second image 12.

As described above, in FIG. 12, when the set percentile is "20", "30", "40", and "50", the representative gradation is "50", "90", "115", and "127", respectively.

Figure 15:
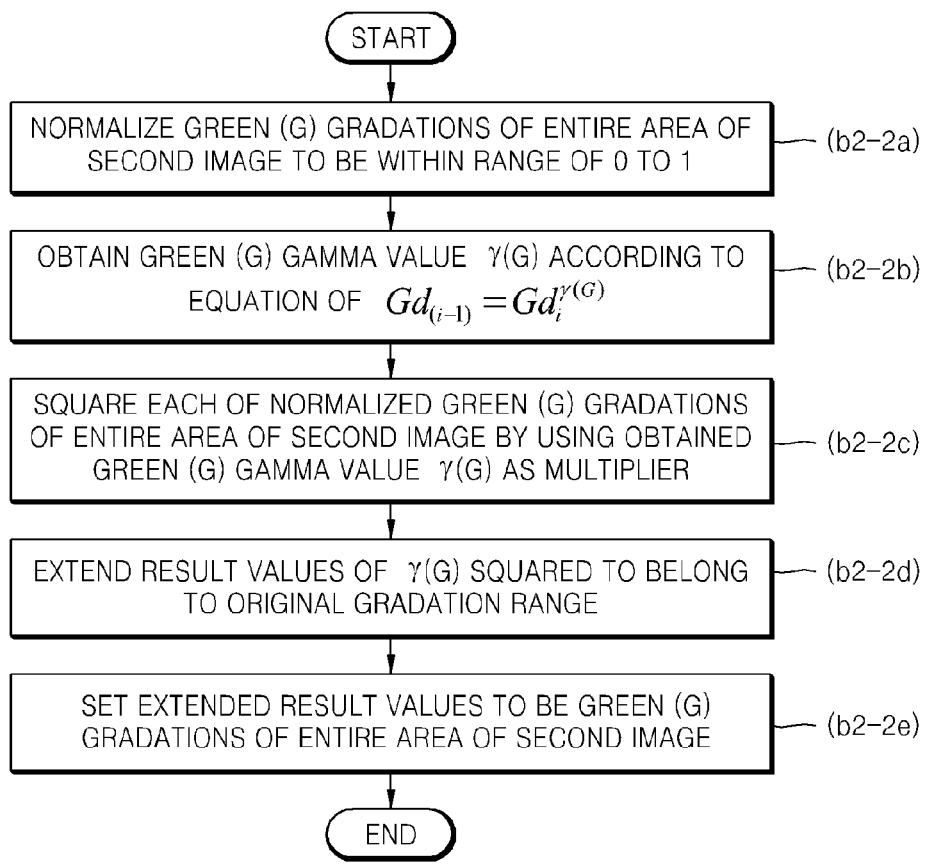
FIG. 15 is a flowchart for explaining in detail operation (b2) of FIG. 7 after the setting of FIG. 14 is completed.

FIG. 15 is a flowchart for explaining the operations performed in the operation (b2) of FIG. 7 after the setting of FIG. 14 is completed. FIG. 15 is substantially the same as that of FIG. 13. However, for a better understanding of the differences between these two figures, the flowchart of FIG. 15 will now be described with reference to FIGS. 2, 9, and 15.

In operation (b2-2a), the green (G) gradations of the entire matching areas 12d and 12a of the second image 12 are normalized to be within a range of "0" to "1". As described above, although a gradation ranges from 0 to 255, the gradations are normalized to 0 or 1 and then restored in order to prevent a result of calculation from falling beyond the range.

The representative green (G) gradation of the matching area 11d of the first image 11 and the representative green (G) gradation of the matching area 12d of the second image 12 are, of course, normalized. Also, after the green (G) gradations of the matching area 11d of the first image 11 and the green (G) gradations of the entire matching areas 12d and 12a of the second image 12 are first normalized, the representative green (G) gradation of the matching area 11d of the first image 11 and the representative green (G) gradation of the matching area 12d of the second image 12 may be obtained.

In operation (b2-2b), assuming that a normalized representative green (G) gradation of the matching area 11d of the first image 11 is $Gd_{(i-1)}$ and a normalized representative green (G) gradation of the matching area 12d of the second image 12 is $Gd_i$, a green (G) gamma value "γ(G)" is obtained according to an equation where $Gd_{(i-1)}=Gd_i^{\gamma(G)}$.

In detail, when a common logarithm is applied to both sides of the above equation, Equation 4 is established.

$$\log(Gd_{(i-1)})=\gamma(G)\cdot\log(Gd_i) \qquad \text{[Equation 4]}$$

Accordingly, the green (G) gamma value "γ(G)" may be obtained by Equation 3.

$$\gamma(G) = \frac{\log(Gd_{(i-1)})}{\log(Gd_i)} \qquad \text{[Equation 5]}$$

Next, in an operation (b2-2c), each of the normalized green (G) gradations of the entire matching areas 12d and 12a of the second image 12 is squared by using the obtained green (G) gamma value "γ(G)" as a multiplier.

Accordingly, as described above with reference to FIG. 9, the green (G) gradations of the entire matching areas 12d and 12a of the second image 12 are changed to make the representative green (G) gradation $Gd_{(i-1)}$ of the matching area 11d of the first image 11 the same as the representative green (G) gradation $Gd_i$ of the matching area 12d of the second image 12.

Since the set percentile for the representative green (G) gradation $Gd_{(i-1)}$ of the matching area 11d of the first image 11 and the representative green (G) gradation $Gd_i$ of the matching area 12d of the second image 12 each are less than "50", a change rate in changing each of the green (G) gradations of the entire matching areas 12d and 12a of the second image 12 may be set according to a level of the green (G) gradation before the gradations of the second image 12 are changed.

According to experiments, it is found that brightness saturation occurs when the green (G) gamma value "γ(G)" is less than "0.4". Thus, the green (G) gamma value "γ(G)" should be greater than or equal to "0.4".

Next, in operation (b2-2d), the result values of the "γ(G)" squared are extended to the original gradation range. In operation (b2-2e), the extended result values are set to be the green (G) gradations of the entire matching areas 12d and 12a of the second image 12.

Figure 16:
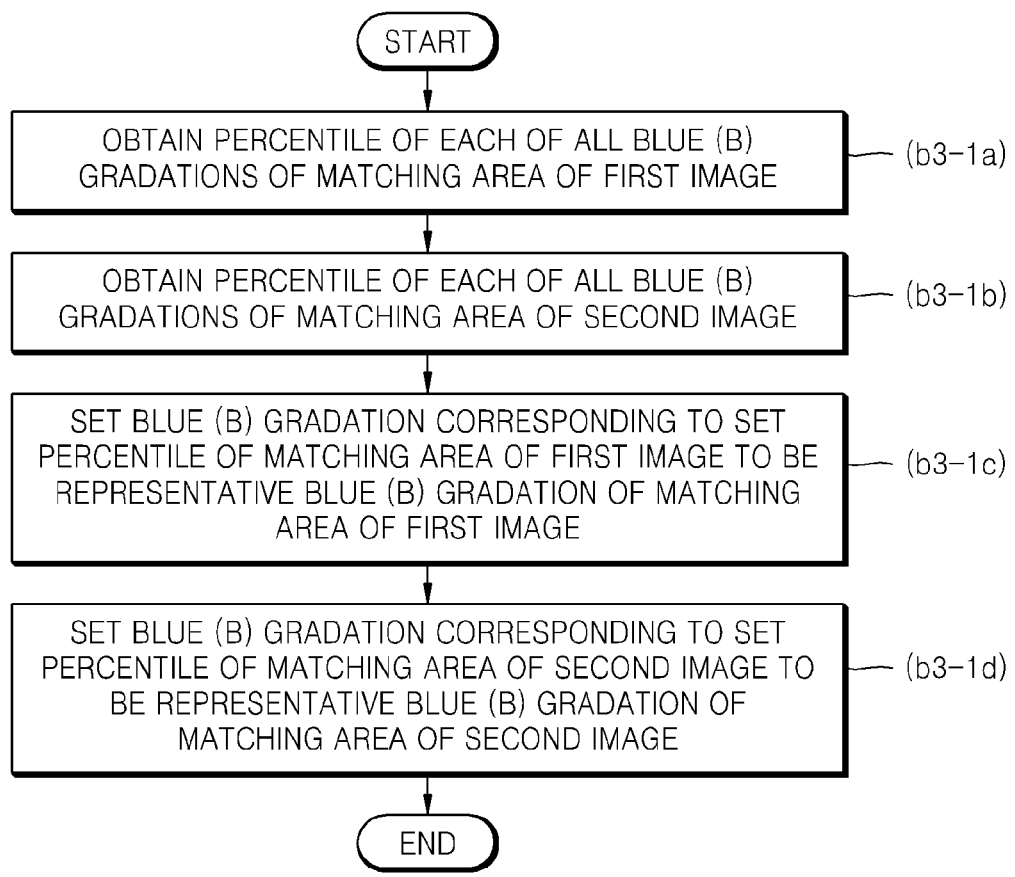
FIG. 16 is a flowchart for explaining setting a representative blue (B) gradation of the matching area of the first image and a representative blue (B) gradation of the matching area of the second image in the operation (b3) of FIG. 7.

FIG. 16 is a flowchart for explaining how to set a representative blue (B) gradation of the matching area 11d of the first image 11 and a representative blue (B) gradation of the matching area 12d of the second image 12 of FIG. 2, in operation (b3) of FIG. 7. The flowchart illustrated in FIG. 16 is substantially the same as that of FIG. 11. However, for explanation of the differences between these two figures, the flowchart of FIG. 16 will now be described with reference to FIGS. 2, 10, 12, and 16.

In operation (b3-1a), a percentile of each of all blue (B) gradations, for example, 121, of the matching area 11d of the first image 11 is obtained.

In operation (b3-1b), a percentile of each of all blue (B) gradations, for example, 121, of the matching area 12d of the second image 12 is obtained.

In operation (b3-1c), among all blue (B) gradations, for example, 121, of the matching area 11d of the first image 11, a blue (B) gradation corresponding to a set percentile is set to be the representative blue (B) gradation $Bd_{(i-1)}$ of the matching area 11d of the first image 11.

In operation (b3-1d), among all blue (B) gradations, for example, 121, of the matching area 12d of the second image 12, a blue (B) gradation corresponding to a set percentile is set to be the representative blue (B) gradation $Bd_i$ of the matching area 12d of the second image 12.

As described above, in FIG. 12, when the set percentile is "20", "30", "40", and "50", the representative gradation is "50", "90", "115", and "127", respectively.

Figure 17:
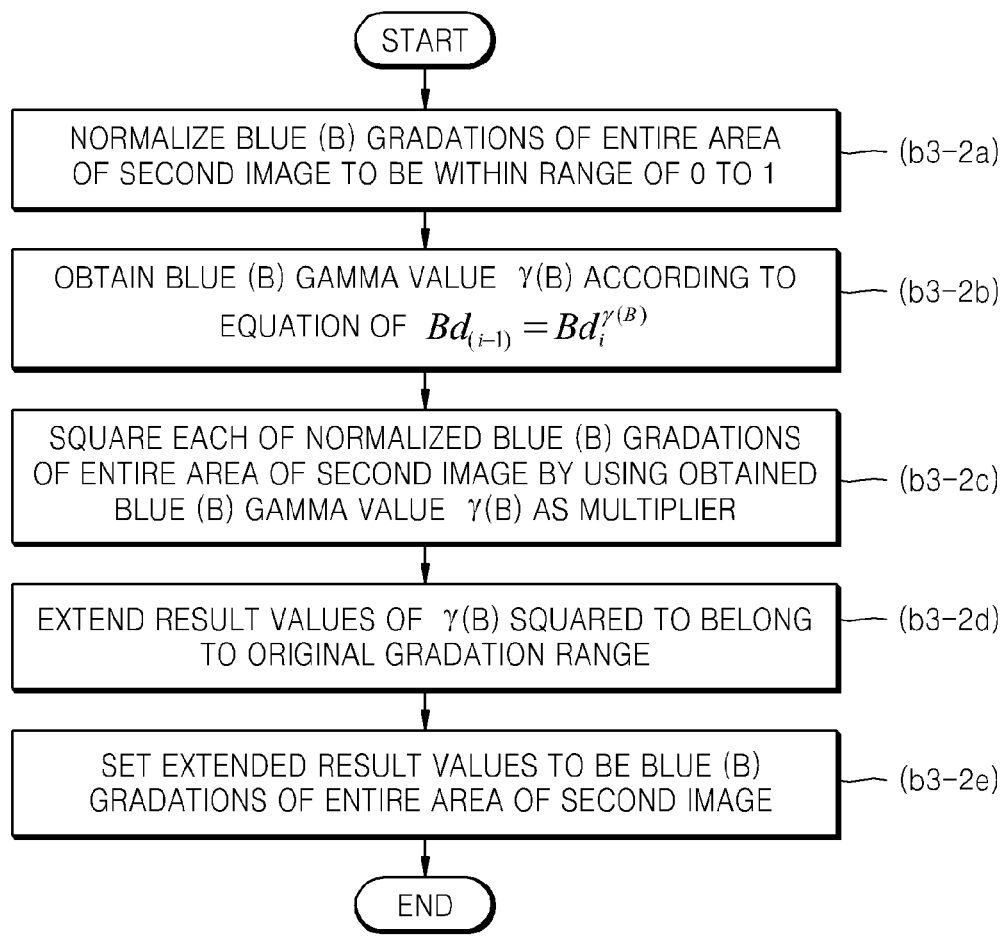
FIG. 17 is a flowchart for explaining in detail operation (b3) of FIG. 7 after the setting of FIG. 16 is completed.

FIG. 17 is a flowchart for explaining in detail the operation (b3) of FIG. 7 after the setting of FIG. 16 is completed. FIG. 17 is substantially the same as that of FIG. 13. However, for a better understanding of the differences between these two figures, the operations of FIG. 17 will now be described with reference to FIGS. 2, 10, and 17.

In operation (b3-2a), the blue (B) gradations of the entire matching areas 12d and 12a of the second image 12 are normalized to be within a range of "0" to "1". As described above, although a gradation ranges from 0 to 255, the gradations are normalized to 0 or 1 and then restored in order to prevent a result of calculation from falling beyond the range.

The representative blue (B) gradation of the matching area 11d of the first image 11 and the representative blue (B) gradation of the matching area 12d of the second image 12 are, of course, normalized. Also, after the blue (B) gradations of the matching area 11d of the first image 11 and the blue (B) gradations of the entire matching areas 12d and 12a of the second image 12 are first normalized, the representative blue (B) gradation of the matching area 11d of the first image 11 and the representative blue (B) gradation of the matching area 12d of the second image 12 may be obtained.

In operation (b3-2b), assuming that a normalized representative blue (B) gradation of the matching area 11d of the first image 11 is $Bd_{(i-1)}$ and a normalized representative blue (B) gradation of the matching area 12d of the second image 12 is $Bd_i$, a blue (B) gamma value "γ(B)" is obtained according to equation $Bd_{(i-1)} = Bd_i^{\gamma(B)}$.

In detail, when a common logarithm is applied to both sides of the above equation, Equation 6 is established.

$$\log(Bd_{(i-1)}) = \gamma(B) \cdot \log(Bd_i) \qquad \text{[Equation 6]}$$

Accordingly, the blue (B) gamma value "γ(B)" may be obtained by Equation 3.

$$\gamma(B) = \frac{\log(Bd_{(i-1)})}{\log(Bd_i)} \qquad \text{[Equation 7]}$$

Next, in operation (b3-2c), each of the normalized blue (B) gradations of the entire matching areas 12d and 12a of the second image 12 is squared by using the obtained blue (B) gamma value "γ(B)" as a multiplier.

Accordingly, as described above with reference to FIG. 10, the blue (B) gradations of the entire matching areas 12d and 12a of the second image 12 are changed to make the representative blue (B) gradation $Bd_{(i-1)}$ of the matching area 11d of the first image 11 the same as the representative blue (B) gradation $Bd_i$ of the matching area 12d of the second image 12.

Since the set percentile for the representative blue (B) gradation $Bd_{(i-1)}$ of the matching area 11d of the first image 11 and the representative blue (B) gradation $Bd_i$ of the matching area 12d of the second image 12 are each less than "50", a change rate in changing each of the blue (B) gradations of the entire matching areas 12d and 12a of the second image 12 may be set according to a level of the blue (B) gradation before the gradations of the second image 12 are changed.

According to experiments, it is found that brightness saturation occurs when the blue (B) gamma value "γ(G)" is less than "0.4". Thus, the blue (B) gamma value "γ(B)" should be greater than or equal to "0.4".

Next, in operation (b3-2d), the result values of the "γ(B)" squared are extended to belong to the original gradation range. In operation (b3-2e), the extended result values are set to be blue (B) gradations of the entire matching areas 12d and 12a of the second image 12.

Figure 18:
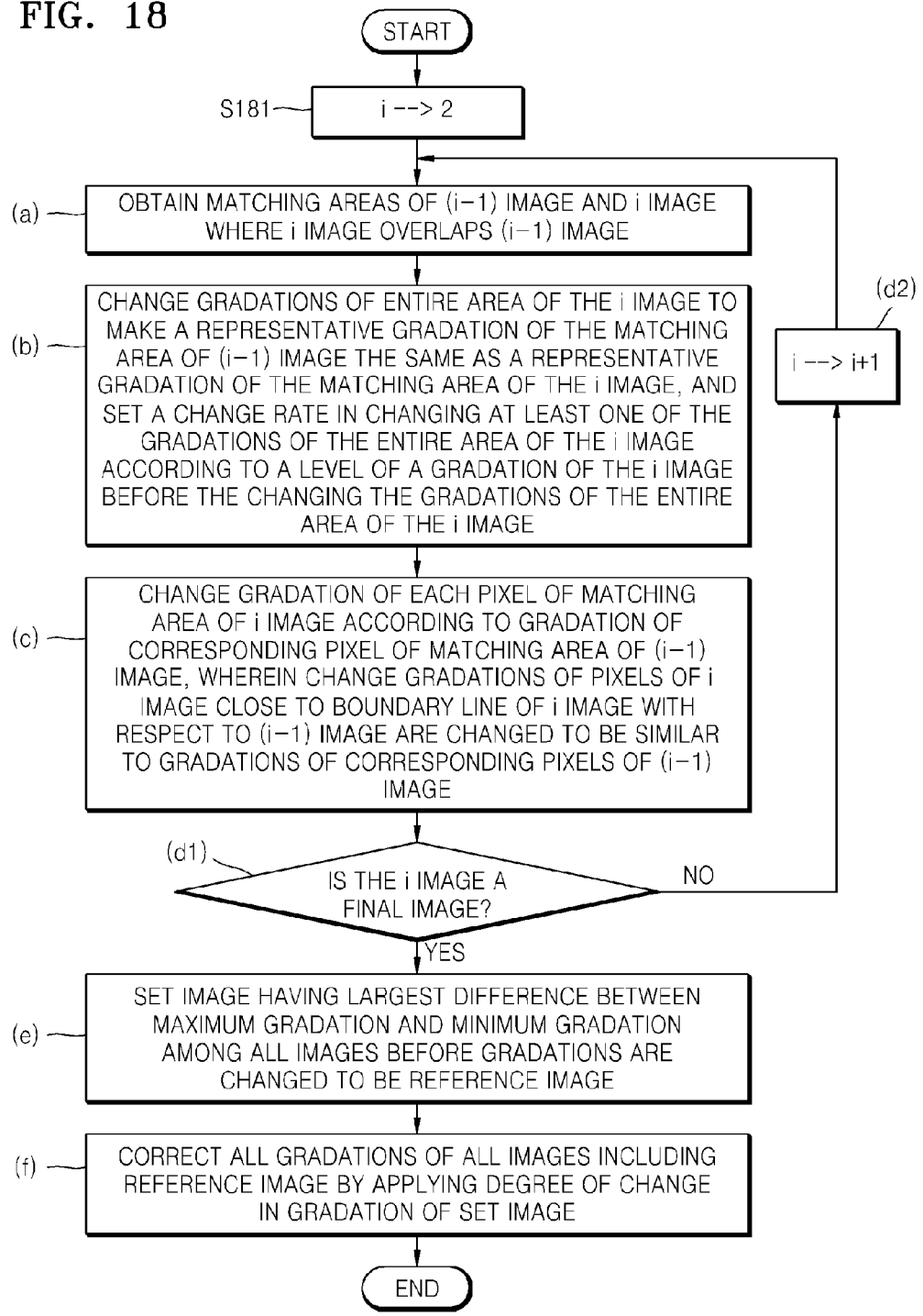
FIG. 18 is a flowchart for explaining a method for stitching an image according to another exemplary embodiment.

FIG. 18 is a flowchart for explaining a method for stitching an image according to another exemplary embodiment. In the present embodiment of FIG. 18, operations (a), (b), and (c) correspond to operations (a), (b), and (c) of the embodiment of FIG. 4, respectively. In other words, FIGS. 5 to 17 and the descriptions thereof regarding the embodiment of FIG. 4 are equally applied to the present embodiment of FIG. 18.

In summary, the gradation correction operations e and f of the embodiment of FIG. 4 is added to the present embodiment of FIG. 18. This is because, only when the embodiment of FIG. 4 is applied, an image stitching effect is very high, but clarity and reproducibility of a panoramic image may be degraded in some cases.

Referring to FIG. 18, the present embodiment includes operations S181 and (a) to (f) as an image stitching method for combining a plurality of images in a digital image processing apparatus.

In operation S181, a variable "i" for sequentially indicating numbers of images subject to the operations (a) to (c) is set to be "2". In operation (a), matching areas of an (i-1) image and an i image where the i image overlaps the (i-1) image are obtained (refer to the description about the operation (a) of FIG. 4).

In operation (b), gradations of the entire area of the i image are changed to make a representative gradation of the matching area of the (i-1) image the same as a representative gradation of the matching area of the i image. In doing so, a change rate in changing each of the gradations of the entire area of the i image is set according to a level of the gradation of the i image before the gradations of the image i are changed (refer to the description about the operation (b) of FIG. 4).

In operation (c), the gradation of each pixel of the matching area of the image is changed according to the gradation of a corresponding pixel of the matching area of the (i-1) image. In doing so, the gradations of the pixels of the i image close to a boundary line of the i image with respect to the (i-1) image are changed to be similar to the gradations of corresponding pixels of the (i-1) image (refer to the description about the operation (c) of FIG. 4).

In the operation (d1), whether the i image is a final image is determined.

In operation (d1), if the i image is not a final image, the variable i is increased by "1" in an operation (d2) and then the operations (a) to (c) are performed. In other words, the operations (a) to (c) are performed for all target images.

In operation (e), among all images before gradations are changed, an image having the largest difference between the maximum gradation and the minimum gradation is set to be a reference image. This is because the image having the largest difference between the maximum gradation and the minimum gradation is highly likely to be an important image, that is, a front-view image, to a user.

In operation (f), all gradations of all images including the reference image are corrected by applying a degree of a change in a gradation of a set reference image. Thus, since the degree of a change in a gradation of the reference image in operation (b) is applied, the gradations of the reference image may be restored to the gradations before the change and all gradations of all the other images may be corrected to be closer to the gradations before the change. Therefore, each of all images may become closer to the original image with respect to the reference image, and thus, clarity and reproducibility of a panoramic image may be additionally improved.

Figure 19:
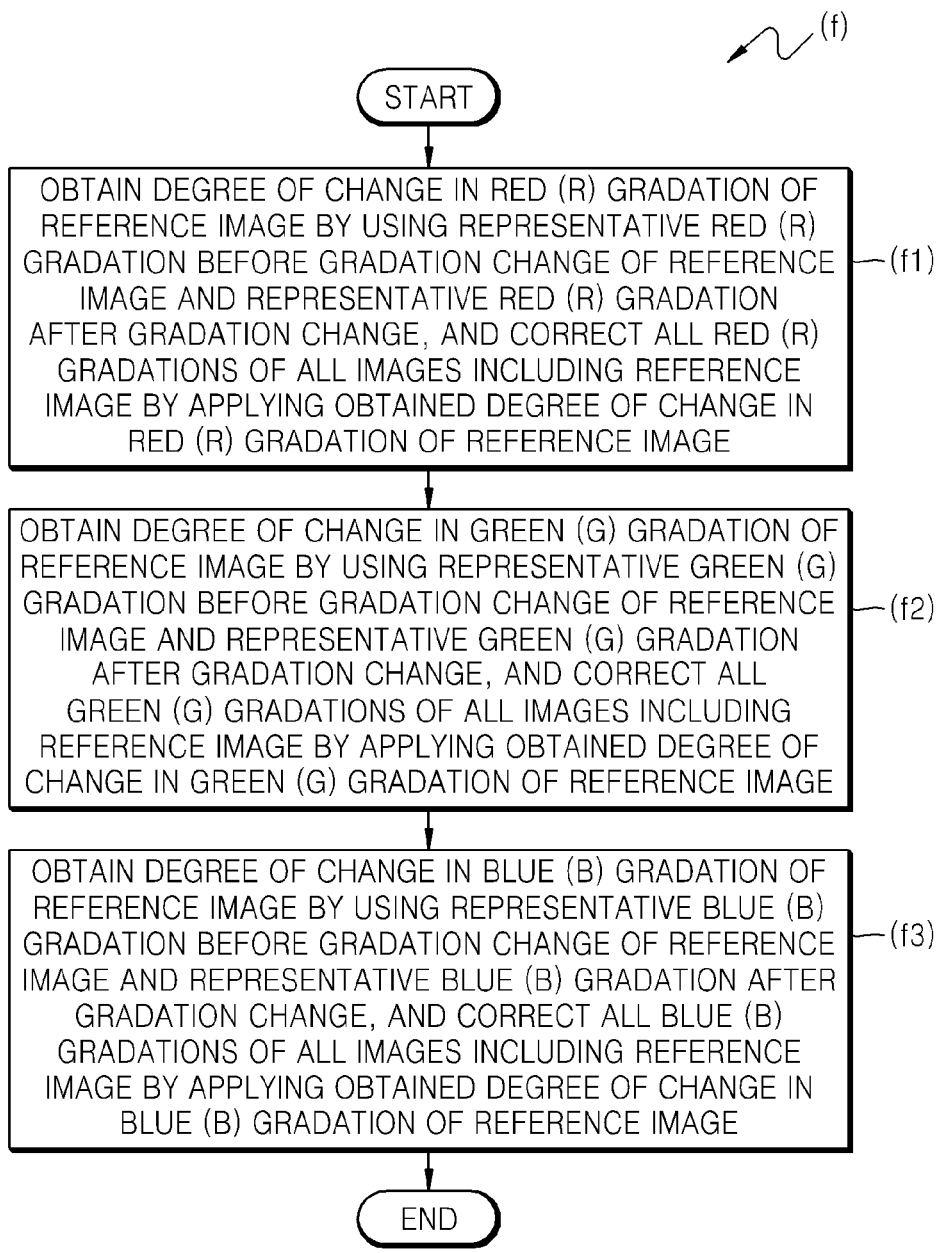
FIG. 19 is a flowchart for explaining in detail the operation (f) of FIG. 18.

FIG. 19 is a flowchart for explaining operation (f) of FIG. 18. Referring to FIG. 19, operation (f) of FIG. 18 includes operations (f1) to (f3).

In operation (f1), a degree of a change in a red (R) gradation of a reference image is obtained by using a representative red (R) gradation before the change of a gradation of the reference image and a representative red (R) gradation after the gradation change. All red (R) gradations of all images including the reference image are corrected by using the obtained degree of a change in the red (R) gradation of the reference image.

In operation (f2), a degree of a change in a green (G) gradation of a reference image is obtained by using a representative green (G) gradation before the change of a gradation of the reference image and a representative green (G) gradation after the gradation change. All green (G) gradations of all images including the reference image are corrected by using the obtained degree of a change in the green (G) gradation of the reference image.

In operation (f3), a degree of a change in a blue (B) gradation of a reference image is obtained by using a representative blue (B) gradation before the change of a gradation of the reference image and a representative blue (B) gradation after the gradation change. All blue (B) gradations of all images including the reference image are corrected by using the obtained degree of a change in the blue (B) gradation of the reference image.

Figure 20:
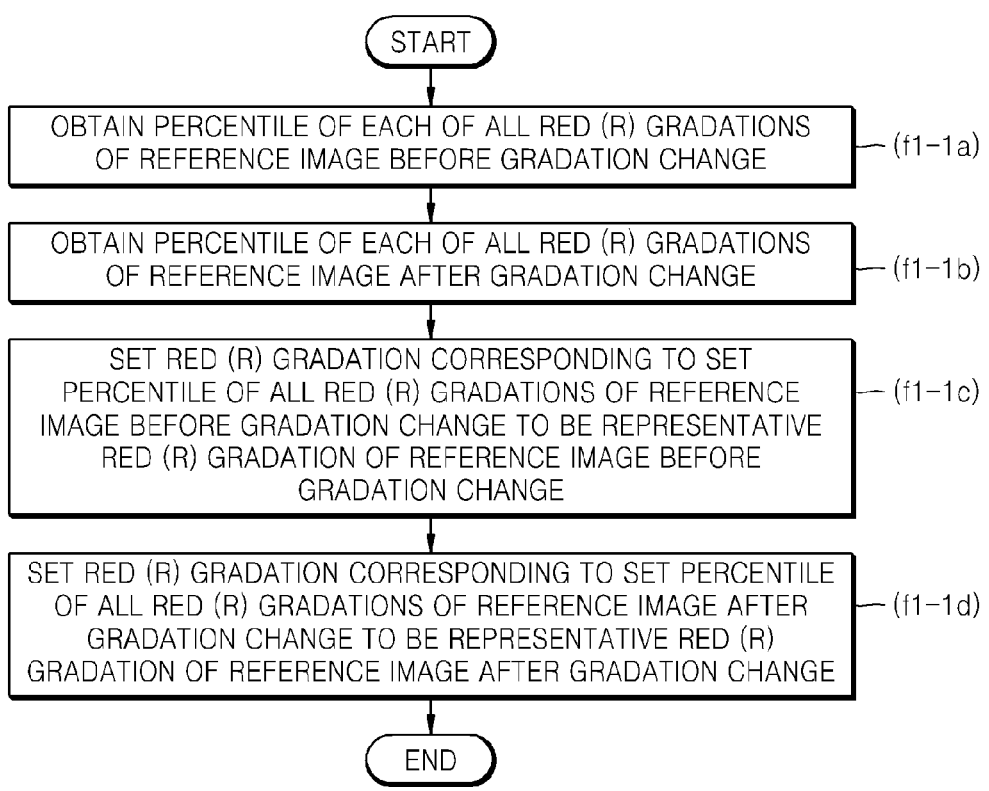
FIG. 20 is a flowchart for explaining in detail how to set a representative red (R) gradation before the change of a gradation of a reference image and a representative red (R) gradation after the gradation change in the operation (f1) of FIG. 19.

FIG. 20 is a flowchart for explaining how to set a representative red (R) gradation before the change of a gradation of a reference image and a representative red (R) gradation after the gradation change in the operation (f1) of FIG. 19 (refer to the description of FIG. 11). Referring to FIG. 20, to set a representative red (R) gradation before the change of a gradation of a reference image and a representative red (R) gradation after the gradation change in the operation (f1) of FIG. 19, in an operation (f1-1a), a percentile of each of all red (R) gradations before a change of a gradation of a reference image is obtained.

In operation (f1-1b), a percentile of each of all red (R) gradations after the gradation change of a reference image is obtained. In operation (f1-1c), among all red (R) gradations before the gradation change of a reference image, a red (R) gradation corresponding to a set percentile is set to be a representative red (R) gradation before the gradation change of a reference image. In operation (f1-1d), among all red (R) gradations after the gradation change of a reference image, a red (R) gradation corresponding to a set percentile is set to be a representative red (R) gradation after the gradation change of a reference image.

Figure 21:
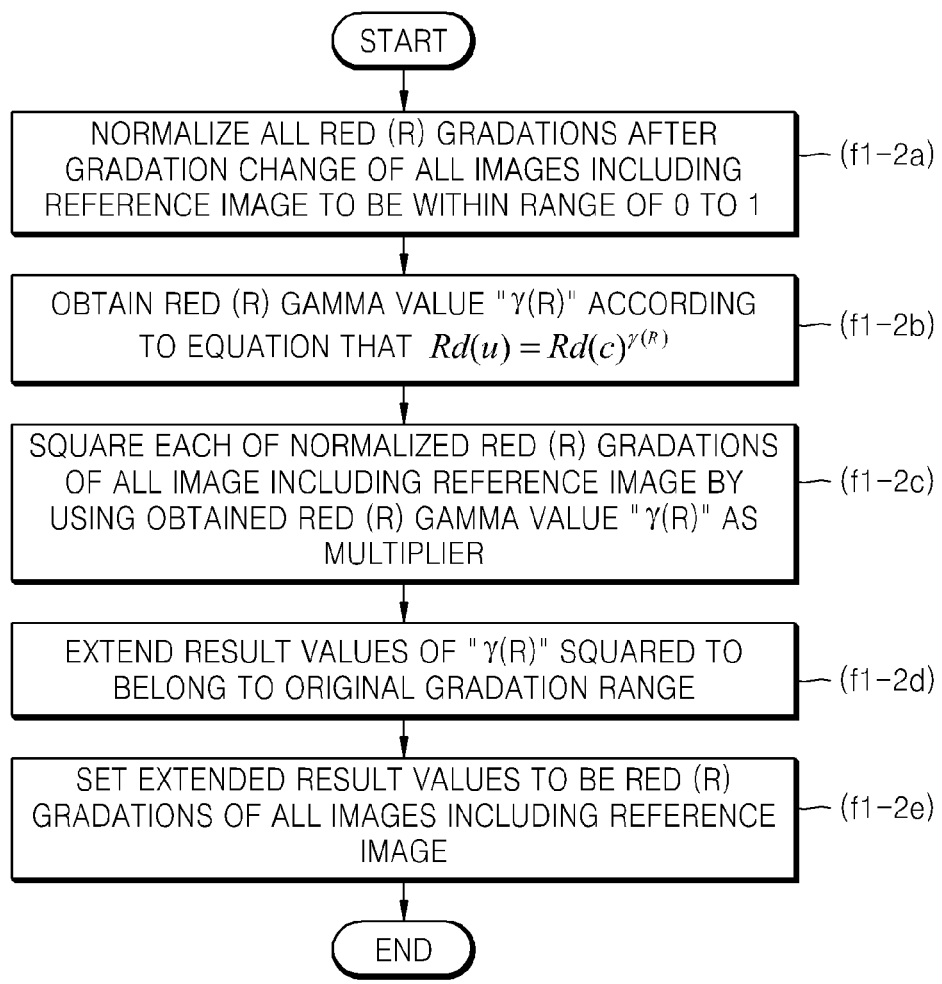
FIG. 21 is a flowchart for explaining in detail operation (f1) of FIG. 19 after the setting of FIG. 20 is completed.

FIG. 21 is a flowchart for explaining in detail operation (f1) of FIG. 19 after the setting of FIG. 20 is completed (refer to the description of FIG. 13). Referring to FIG. 21, in operation (f1-2a), all red (R) gradations after the gradation change of all images including the reference image are normalized to be within a range of "0" to "1".

In operation (f1-2b), assuming that a normalized representative red (R) gradation before the gradation change of a reference image is Rd(u) and a normalized representative red (R) gradation after the gradation change of a reference image is Rd(c), a red (R) gamma value "$\gamma(R)$" is obtained according to an equation that $Rd(u)=Rd(c)^{\gamma(R)}$.

In operation (f1-2c), each of the normalized red (R) gradations of all images including a reference image is squared by using the obtained red (R) gamma value "$\gamma(R)$" as a multiplier. In operation (f1-2d), the result values of the "$\gamma(R)$" squared are extended to belong to the original gradation range. In operation (f1-2e), the extended result values are set to be the red (R) gradations of all images including a reference image.

Figure 22:
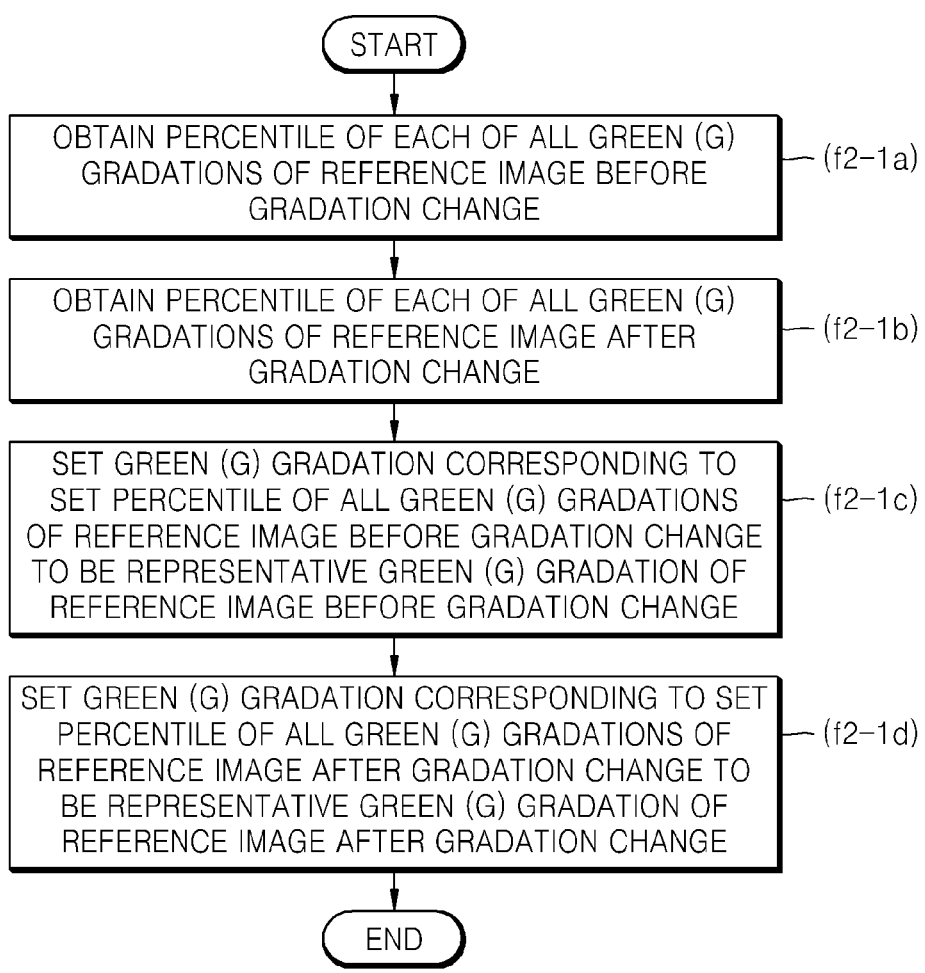
FIG. 22 is a flowchart for explaining in detail how to set a representative green (G) gradation before the change of a gradation of a reference image and a representative green (G) gradation after the gradation change in the operation (f2) of FIG. 19.

FIG. 22 is a flowchart for explaining how to set a representative green (G) gradation before the change of a gradation of a reference image and a representative green (G) gradation after the gradation change in operation (f2) of FIG. 19. Referring to FIG. 22, according to the detailed description of how to set a representative green (G) gradation before the change of a gradation of a reference image and a representative green (G) gradation after the gradation change in operation (f2) of FIG. 19, in operation (f2-1a), a percentile of each of all green (G) gradations before a change of a gradation of a reference image is obtained.

In operation (f2-1b), a percentile of each of all green (G) gradations after the gradation change of a reference image is obtained. In operation (f2-1c), among all green (G) gradations before the gradation change of a reference image, a green (G) gradation corresponding to a set percentile is set to be a representative green (G) gradation before the gradation change of a reference image. In operation (f2-1d), among all green (G) gradations after the gradation change of a reference image, a green (G) gradation corresponding to a set percentile is set to be a representative green (G) gradation after the gradation change of a reference image.

Figure 23:
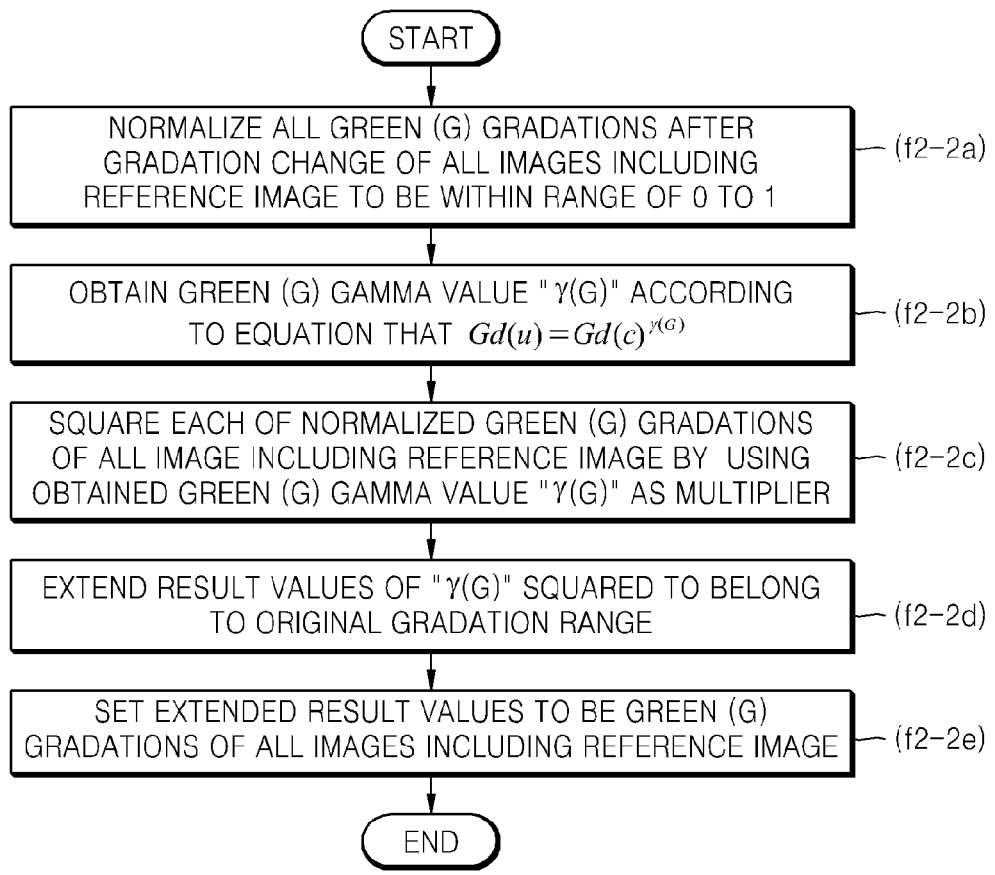
FIG. 23 is a flowchart for explaining in detail operation (f2) of FIG. 19 after the setting of FIG. 22 is completed.

FIG. 23 is a flowchart for explaining in detail operation (f2) of FIG. 19 after the setting of FIG. 22 is completed (refer to the description of FIG. 15). Referring to FIG. 23, in operation (f2-2a), all green (G) gradations after the gradation change of all images including the reference image are normalized to be within a range of "0" to "1".

In operation (f2-2b), assuming that a normalized representative green (G) gradation before the gradation change of a reference image is Gd(u) and a normalized representative green (G) gradation after the gradation change of a reference image is Gd(c), a green (G) gamma value "γ(G)" is obtained according to equation Gd(u)=Gd(c)$^{γ(G)}$.

In operation (f2-2c), each of the normalized green (G) gradations of all images including a reference image is squared by using the obtained green (G) gamma value "γ(G)" as a multiplier. In operation (f2-2d), the result values of the "γ(G)" squared are extended to belong to the original gradation range. In an operation (f2-2e), the extended result values are set to be the green (G) gradations of all images including a reference image.

Figure 24:
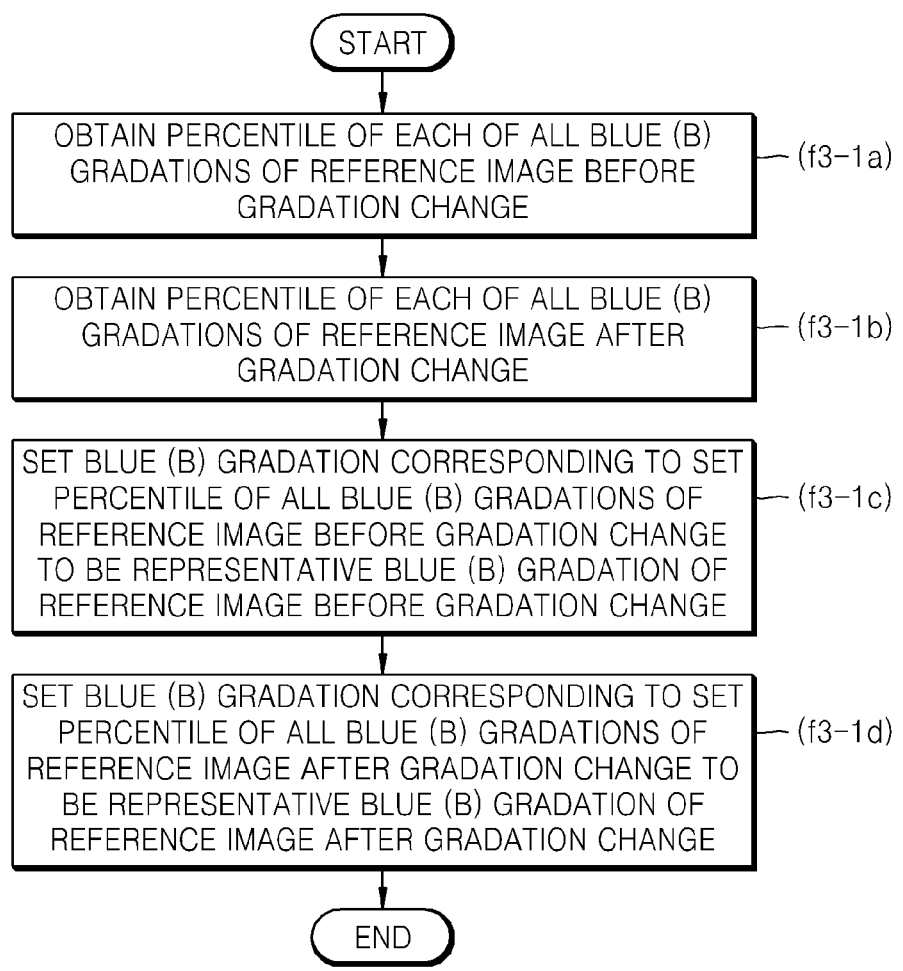
FIG. 24 is a flowchart for explaining in detail how to set a representative blue (B) gradation before the change of a gradation of a reference image and a representative blue (B) gradation after the gradation change in the operation (f3) of FIG. 19.

FIG. 24 is a flowchart for explaining how to set a representative blue (B) gradation before the change of a gradation of a reference image and a representative blue (B) gradation after the gradation change in operation (f3) of FIG. 19. Referring to FIG. 24, according to how to set a representative blue (B) gradation before the change of a gradation of a reference image and a representative blue (B) gradation after the gradation change in the operation (f3) of FIG. 19, in operation (f3-1a), a percentile of each of all blue (B) gradations before a change of a gradation of a reference image is obtained.

In operation (f3-1b), a percentile of each of all blue (B) gradations after the gradation change of a reference image is obtained. In operation (f3-1c), among all blue (B) gradations before the gradation change of a reference image, a blue (B) gradation corresponding to a set percentile is set to be a representative blue (B) gradation before the gradation change of a reference image. In operation (f3-1d), among all blue (B) gradations after the gradation change of a reference image, a blue (B) gradation corresponding to a set percentile is set to be a representative blue (B) gradation after the gradation change of a reference image.

Figure 25:
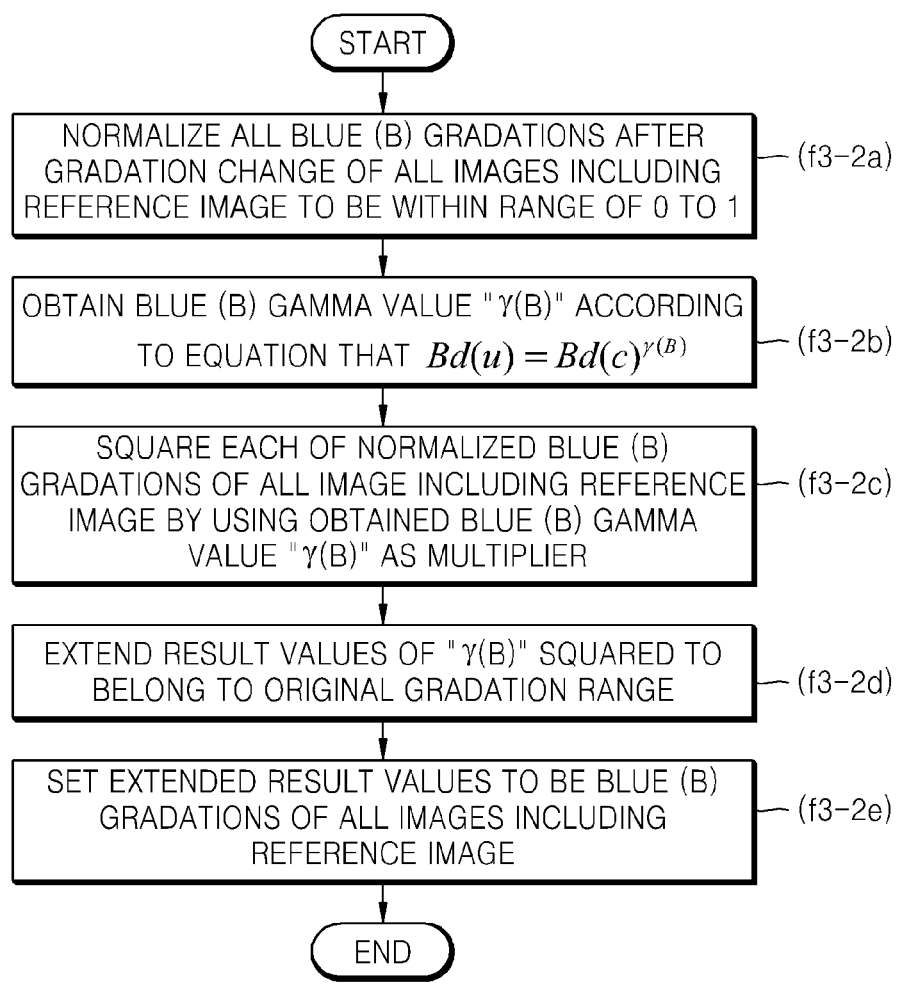
FIG. 25 is a flowchart for explaining in detail operation (f3) of FIG. 19 after the setting of FIG. 24 is completed.

FIG. 25 is a flowchart for explaining in detail operation (f3) of FIG. 19 after the setting of FIG. 24 is completed (refer to the description of FIG. 17). Referring to FIG. 25, in operation (f3-2a), all blue (B) gradations after the gradation change of all images including the reference image are normalized to be within a range of "0" to "1".

In operation (f3-2b), assuming that a normalized representative blue (B) gradation before the gradation change of a reference image is Bd(u) and a normalized representative blue (B) gradation after the gradation change of a reference image is Bd(c), a blue (B) gamma value "γ(B)" is obtained according to equation Bd(u)=Bd(c)$^{γ(B)}$.

In operation (f3-2c), each of the normalized blue (B) gradations of all image including a reference image is squared by using the obtained blue (B) gamma value "γ(B)" as a multiplier. In operation (f3-2d), the result values of the "γ(B)" squared are extended to belong to the original gradation range. In operation (f3-2e), the extended result values are set to be the blue (B) gradations of all images including a reference image.

Figure 26:
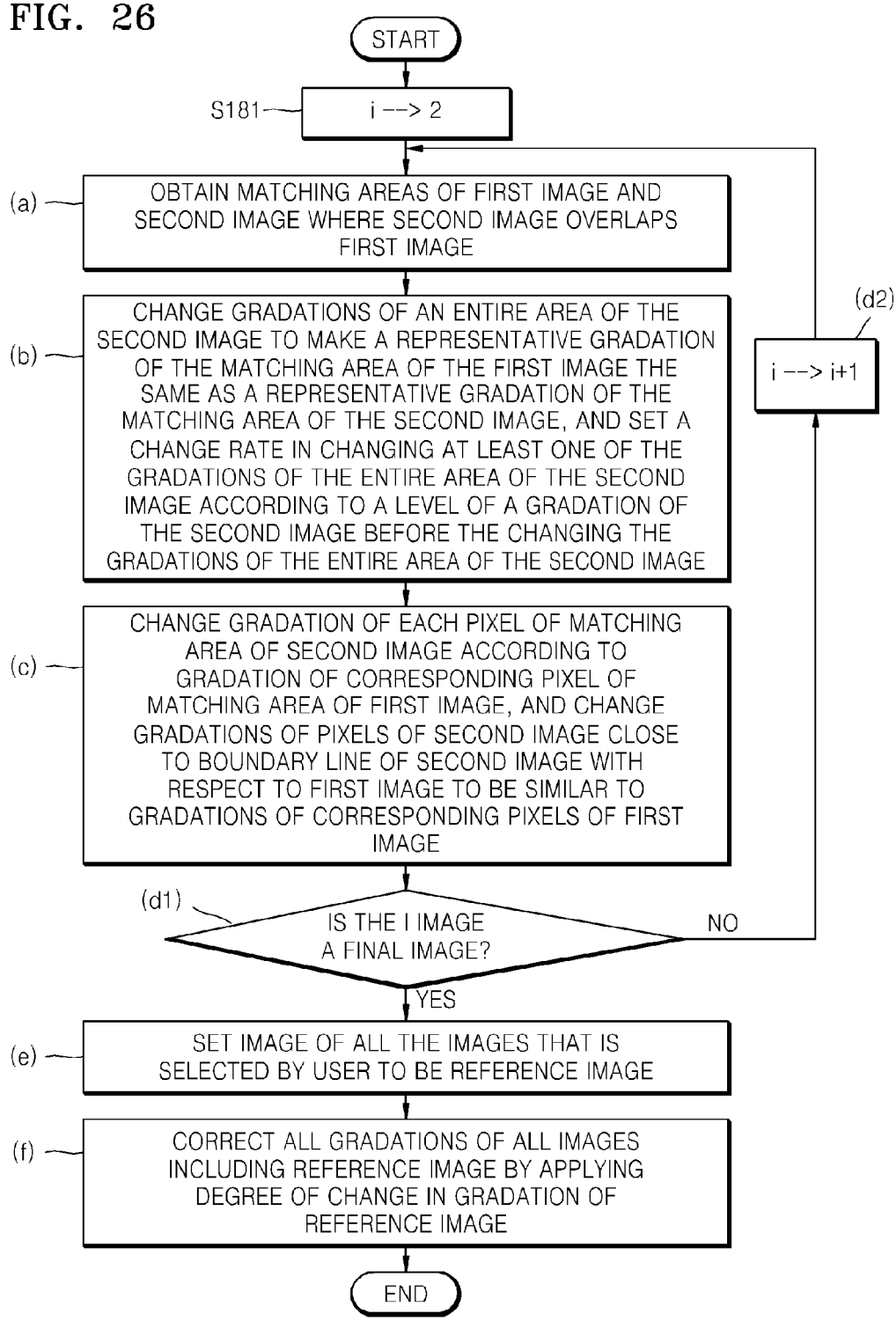
FIG. 26 is a flowchart for explaining a method for stitching an image according to another exemplary embodiment.

FIG. 26 is a flowchart for explaining a method for stitching an image according to another exemplary embodiment. The embodiment of FIG. 26 is substantially the same as the embodiment of FIG. 18, except for operation (e), and thus, the other operations of the embodiment of FIG. 26 are the same as those of the embodiment of FIG. 18.

Referring to FIG. 26, in operation (e), an image selected by a user among all images is set to be a reference image. The other correction operation (f) is the same as the operation of the embodiment of FIG. 18 that is described above with reference to FIGS. 19 to 25.

Thus, according to the present embodiment of FIG. 26, a degree of a change in a gradation of a reference image in operation (b) is applied and thus gradations of the reference image may be restored to the gradations before the change and all gradations of all other images may be corrected to be similar to the gradation before the change. Therefore, each of all images may become closer to the original image with respect to the reference image, and thus, clarity and reproducibility of a panoramic image may be additionally improved.

As described above, according to the above-described exemplary embodiments, the gradations of the entire area of the second image are changed to make the representative gradation of the matching area of the first image the same as the representative gradation of the matching area of the second image. Thus, the smear-looking phenomenon in the vicinity of a boundary line of the second image to the first image when a difference in gradation between the first and second images 11 and 12 is largely prevented.

The change rate in changing each of the gradations of the entire area of the second image is set according to a level of the gradation of the second image before the gradations of the second image 12 are changed. In other words, while the low gradations of the second image are changed to be similar to the low gradations of the first image, the high gradations of the second image are changed to be slightly close or less similar to the high gradations of the first image.

Thus, since only the low gradations of the second image are changed to be similar to the low gradations of the first image by using a visual characteristic that is sensitive to a difference in the low gradation, the generation of a smear-looking phenomenon may be prevented and the change in gradation of the second image may be reduced.

In the meantime, while the gradation of each pixel of the matching area of the second image that is changed above is changed according to the gradation of a corresponding pixel of the matching area of the first image, the gradations of the pixels of the second image close to the boundary line of the second image with respect to the first image are changed to be similar to the gradations of the corresponding pixels of the first image.

Accordingly, the vicinity of the boundary line of the second image to the first image does not appear to be remarkable.

While the inventive concept has been particularly shown and described with reference to exemplary embodiments thereof, it will be understood by those of ordinary skill in the art that various changes in form and details may be made therein without departing from the spirit and scope of the present inventive concept as defined by the following claims.

What is claimed is:

1. A method of stitching an image to combine at least a first image and a second image in a digital image processing apparatus, the method comprising:

obtaining matching areas of a first image and a second image where the second image overlaps the first image;

changing gradations of an entire area of the second image to make a representative gradation of the matching area of the first image the same as a representative gradation of the matching area of the second image, wherein a change rate in changing at least one of the gradations of the entire area of the second image is set according to a level of a gradation of the second image before the changing the gradations of the entire area of the second image; and changing a gradation of each pixel of the matching area of the second image according to a gradation of a corresponding pixel of the matching area of the first image, and changing gradations of pixels of the second image close to a boundary line of the second image with respect to the first image to be similar to gradations of corresponding pixels of the first image.

2. The method of claim 1, wherein, in the changing the gradations of the entire area of the second image, a low gradation of the second image is changed to be similar to a low gradation of the first image, while a high gradation of the second image is changed to be less similar to a high gradation of the first image.

3. The method of claim 1, wherein the changing the gradations of the entire area of the second image to make the representative gradation of the matching area of the first image the same as the representative gradation of the matching area of the second image comprises:

changing red (R) gradations of the entire area of the second image to make a representative red (R) gradation in the matching area of the first image the same as a representative red (R) gradation of the matching area of the second image, wherein a change rate in changing each of the red (R) gradations of the entire area of the second image is set according to a level of a red (R) gradation of the second image before the changing the gradations of the entire area of the second image;

changing green (G) gradations in the entire area of the second image to make a representative green (G) gradation of the matching area of the first image the same as a representative green (G) gradation of the matching area of the second image, wherein a change rate in changing each of green (G) gradations in the entire area of the second image is set according to a level of a green (G) gradation of the second image before the changing the gradations of the entire area of the second image; and changing blue (B) gradations in the entire area of the second image to make a representative blue (B) gradation of the matching area of the first image the same as a representative blue (B) gradation of the matching area of the second image, wherein a change rate in changing each of blue (B) gradations in the entire area of the second image is set according to a level of a blue (B) gradation of the second image before the changing the gradations of the entire area of the second image.

4. The method of claim 3, wherein, in the changing the red (R) gradations of the entire area of the second image to make the representative red (R) gradation in the matching area of the first image the same as the representative red (R) gradation of the matching area of the second image, a setting of the representative red (R) gradation in the matching area of the first image and the representative red (R) gradation of the matching area of the second image comprises:

obtaining a percentile of each of all red (R) gradations of the matching area of the first image;

obtaining a percentile of each of all red (R) gradations of the matching area of the second image;

setting a red (R) gradation corresponding to a set percentile of all red (R) gradations of the matching area of the first image to be a representative red (R) gradation of the matching area of the first image; and setting a red (R) gradation corresponding to a set percentile of all red (R) gradations of the matching area of the second image to be a representative red (R) gradation of the matching area of the second image.

5. The method of claim 4, wherein the changing the red (R) gradations of the entire area of the second image to make the representative red (R) gradation in the matching area of the first image the same as the representative red (R) gradation of the matching area of the second image comprises:

normalizing the red (R) gradations of the entire area of the second image to be within a range of 0 to 1;

assuming that a normalized representative red (R) gradation of the matching area of the first image is $Rd_{(i-1)}$ and a normalized representative red (R) gradation of the matching area of the second image is $Rd_i$, obtaining a red (R) gamma value $\gamma(R)$ according to equation $Rd_{(i-1)} = Rd_i^{\gamma(R)}$;

squaring each of normalized red (R) gradations of the entire area of the second image by using the obtained red (R) gamma value $\gamma(R)$ as a multiplier;

extending result values of $\gamma(R)$ squared to belong to an original gradation range; and setting extended result values to be red (R) gradations of the entire area of the second image.

6. The method of claim 3, wherein, in the changing the green (G) gradations in the entire area of the second image to make the representative green (G) gradation of the matching area of the first image the same as the representative green (G) gradation of the matching area of the second image, a setting of the representative green (G) gradation in the matching area of the first image and the representative green (G) gradation of the matching area of the second image comprises:

obtaining a percentile of each of all green (G) gradations of the matching area of the first image;

obtaining a percentile of each of all green (G) gradations of the matching area of the second image;

setting a green (G) gradation corresponding to a set percentile of all green (G) gradations of the matching area of the first image to be a representative green (G) gradation of the matching area of the first image; and setting a green (G) gradation corresponding to a set percentile of all green (G) gradations of the matching area of the second image to be a representative green (G) gradation of the matching area of the second image.

7. The method of claim 6, wherein the changing the green (G) gradations in the entire area of the second image to make the representative green (G) gradation of the matching area of the first image the same as the representative green (G) gradation of the matching area of the second image comprises:

normalizing the green (G) gradations of the entire area of the second image to be within a range of 0 to 1;

assuming that a normalized representative green (G) gradation of the matching area of the first image is $Gd_{(i-1)}$ and a normalized representative green (G) gradation of the matching area of the second image is $Gd_i$, obtaining a green (G) gamma value $\gamma(G)$ according to equation $Gd_{(i-1)} = Gd_i^{\gamma(G)}$;

squaring each of normalized green (G) gradations of the entire area of the second image by using the obtained green (G) gamma value $\gamma(G)$ as a multiplier;

extending result values of $\gamma(G)$ squared to belong to an original gradation range; and setting extended result values to be green (G) gradations of the entire area of the second image.

8. The method of claim 3, wherein, in the changing blue (B) gradations in the entire area of the second image to make the representative blue (B) gradation of the matching area of the first image the same as the representative blue (B) gradation of the matching area of the second image, a setting of the representative blue (B) gradation in the matching area of the first image and the representative blue (B) gradation of the matching area of the second image comprises:

obtaining a percentile of each of all blue (B) gradations of the matching area of the first image;

obtaining a percentile of each of all blue (B) gradations of the matching area of the second image;

setting a blue (B) gradation corresponding to a set percentile of all blue (B) gradations of the matching area of the first image to be a representative blue (B) gradation of the matching area of the first image; and setting a blue (B) gradation corresponding to a set percentile of all blue (B) gradations of the matching area of the second image to be a representative blue (B) gradation of the matching area of the second image.

9. The method of claim 8, wherein the changing blue (B) gradations in the entire area of the second image to make the representative blue (B) gradation of the matching area of the first image the same as the representative blue (B) gradation of the matching area of the second image comprises:

normalizing the blue (B) gradations of the entire area of the second image to be within a range of 0 to 1;

assuming that a normalized representative blue (B) gradation of the matching area of the first image is $Bd_{(i-1)}$ and a normalized representative blue (B) gradation of the matching area of the second image is $Bd_i$, obtaining a blue (B) gamma value γ(B) according to equation $Bd_{(i-1)} = Bd_i^{\gamma(B)}$;

squaring each of normalized blue (B) gradations of the entire area of the second image by using the obtained blue (B) gamma value γ(B) as a multiplier;

extending result values of γ(B) squared to belong to an original gradation range; and setting extended result values to be blue (B) gradations of the entire area of the second image.

10. A method of stitching an image to combine a plurality of images in a digital image processing apparatus, the method comprising:

obtaining matching areas of a first image and a second image where the second image overlaps the first image;

changing gradations of an entire area of the second image to make a representative gradation of the matching area of the first image the same as a representative gradation of the matching area of the second image, wherein a change rate in changing at least one of the gradations of the entire area of the second image is set according to a level of a gradation of the second image before the changing the gradations of the entire area of the second image;

changing a gradation of each pixel of the matching area of the second image according to a gradation of a corresponding pixel of the matching area of the first image, and changing gradations of pixels of the second image close to a boundary line of the second image with respect to the first image to be similar to gradations of corresponding pixels of the first image;

performing the obtaining the matching areas of the first and second images, the changing the gradations of the entire area of the second image and the changing the gradation of each pixel of the matching area of the second image with respect to all images;

setting an image having a largest difference between a maximum gradation and a minimum gradation of all images before a gradation change, to be a reference image; and correcting all gradations of all images including the reference image by applying a degree of a change in a gradation of the reference image.

11. The method of claim 10, wherein the correcting all gradations of all the images including the reference image by applying the degree of the change in the gradation of the reference image comprises:

obtaining a degree of a change in a red (R) gradation of the reference image by using a representative red (R) gradation before a gradation change of the reference image and a representative red (R) gradation after the gradation change, and correcting all red (R) gradations of all images including the reference image by applying an obtained degree of the change in the red (R) gradation of the reference image;

obtaining a degree of a change in a green (G) gradation of the reference image by using a representative green (G) gradation before a gradation change of the reference image and a representative green (G) gradation after the gradation change, and correcting all green (G) gradations of all images including the reference image by applying an obtained degree of the change in the green (G) gradation of the reference image; and obtaining a degree of a change in a blue (B) gradation of the reference image by using a representative blue (B) gradation before a gradation change of the reference image and a representative blue (B) gradation after the gradation change, and correcting all blue (B) gradations of all images including the reference image by applying an obtained degree of the change in the blue (B) gradation of the reference image.

12. The method of claim 11, wherein, in the obtaining the degree of the change in the red (R) gradation of the reference image, and the correcting all red (R) gradations of all images including the reference image, a setting of the representative red (R) gradation of the reference image before a gradation change and the representative red (R) gradation of the reference image after the gradation change comprises:

obtaining a percentile of each of all red (R) gradations of the reference image before a gradation change;

obtaining a percentile of each of all red (R) gradations of the reference image after the gradation change;

setting a red (R) gradation corresponding to a set percentile of all red (R) gradations of the reference image before the gradation change to be a representative red (R) gradation of the reference image before the gradation change; and setting a red (R) gradation corresponding to a set percentile of all red (R) gradations of the reference image after a gradation change to be a representative red (R) gradation of the reference image after the gradation change.

13. The method of claim 12, wherein the obtaining the degree of the change in the red (R) gradation of the reference image, and the correcting all red (R) gradations of all images including the reference image comprises:

normalizing all red (R) gradations after a gradation change of all images including the reference image to be within a range of 0 to 1;

assuming that a normalized representative red (R) gradation before the gradation change of the reference image is Rd(u) and a normalized representative red (R) gradation after the gradation change of the reference image is Rd(c), obtaining a red (R) gamma value "γ(R)" according to equation $Rd(u) = Rd(c)^{\gamma(R)}$;

squaring each of the normalized red (R) gradations of all image including the reference image by using an obtained red (R) gamma value "γ(R)" as a multiplier;

extending result values of the "γ(R)" squared to belong to an original gradation range; and setting the extended result values to be the red (R) gradations of all images including the reference image.

14. The method of claim 11, wherein, in the obtaining the degree of the change in the green (G) gradation of the reference image, and the correcting all green (G) gradations of all images including the reference image, a setting of the representative green (G) gradation of the reference image before a gradation change and the representative green (G) gradation of the reference image after the gradation change comprises:
- obtaining a percentile of each of all green (G) gradations of the reference image before a gradation change;
- obtaining a percentile of each of all green (G) gradations of the reference image after the gradation change;
- setting a green (G) gradation corresponding to a set percentile of all green (G) gradations of the reference image before the gradation change to be a representative green (G) gradation of the reference image before the gradation change; and
- setting a green (G) gradation corresponding to a set percentile of all green (G) gradations of the reference image after a gradation change to be a representative green (G) gradation of the reference image after the gradation change.

15. The method of claim 14, wherein the obtaining the degree of the change in the green (G) gradation of the reference image, and the correcting all green (G) gradations of all images including the reference image comprises:
- normalizing all green (G) gradations after a gradation change of all images including the reference image to be within a range of 0 to 1;
- assuming that a normalized representative green (G) gradation before the gradation change of the reference image is Gd(u) and a normalized representative green (G) gradation after the gradation change of the reference image is Gd(c), obtaining a green (G) gamma value "$\gamma(G)$" according to equation $Gd(u)=Gd(c)^{\gamma(G)}$;
- squaring each of the normalized green (G) gradations of all image including the reference image by using an obtained green (G) gamma value "$\gamma(G)$" as a multiplier;
- extending result values of the "$\gamma(G)$" squared to belong to an original gradation range; and
- setting the extended result values to be the green (G) gradations of all images including the reference image.

16. The method of claim 11, wherein, in obtaining the degree of the change in the blue (B) gradation of the reference image, and in correcting all blue (B) gradations of all images including the reference image, a setting of the representative blue (B) gradation of the reference image before a gradation change and the representative blue (B) gradation of the reference image after the gradation change comprises:
- obtaining a percentile of each of all blue (B) gradations of the reference image before a gradation change;
- obtaining a percentile of each of all blue (B) gradations of the reference image after the gradation change;
- setting a blue (B) gradation corresponding to a set percentile of all blue (B) gradations of the reference image before the gradation change to be a representative blue (B) gradation of the reference image before the gradation change; and
- setting a blue (B) gradation corresponding to a set percentile of all blue (B) gradations of the reference image after a gradation change to be a representative blue (B) gradation of the reference image after the gradation change.

17. The method of claim 16, wherein the obtaining the degree of the change in the blue (B) gradation of the reference image, and the correcting all blue (B) gradations of all images including the reference image comprises:
- normalizing all blue (B) gradations after a gradation change of all images including the reference image to be within a range of 0 to 1;
- assuming that a normalized representative blue (B) gradation before the gradation change of the reference image is Bd(u) and a normalized representative blue (B) gradation after the gradation change of the reference image is Bd(c), obtaining a blue (B) gamma value "$\gamma(B)$" according to equation $Bd(u)=Bd(c)^{\gamma(B)}$;
- squaring each of the normalized blue (B) gradations of all image including the reference image by using an obtained blue (B) gamma value "$\gamma(B)$" as a multiplier;
- extending result values of the "$\gamma(B)$" squared to belong to an original gradation range; and
- setting the extended result values to be the blue (B) gradations of all images including the reference image.

18. A method of stitching an image to combine a plurality of images in a digital image processing apparatus, the method comprising:
- obtaining matching areas of a first image and a second image where the second image overlaps the first image;
- changing gradations of an entire area of the second image to make a representative gradation of the matching area of the first image the same as a representative gradation of the matching area of the second image, wherein a change rate in changing at least one of the gradations of the entire area of the second image is set according to a level of a gradation of the second image before the changing the gradations of the entire area of the second image;
- changing a gradation of each pixel of the matching area of the second image according to a gradation of a corresponding pixel of the matching area of the first image, and changing gradations of pixels of the second image close to a boundary line of the second image with respect to the first image to be similar to gradations of corresponding pixels of the first image;
- performing the obtaining the matching areas of the first image and the second image where the second image overlaps the first image, changing the gradations of the entire area of the second image, and changing the gradation of each pixel of the matching area of the second image with respect to all images;
- setting an image of all the images that is selected by a user, to be a reference image; and
- correcting all gradations of all images including the reference image by applying a degree of a change in a gradation of the reference image.

19. The method of claim 18, wherein when the degree of the change in the gradation of the reference image is applied to the changed gradations of the entire area of the second image, the gradation of the reference image is restored to the gradation before the change, and all gradations of all of the other images are corrected to be similar to the gradation before the change.

* * * * *